United States Patent [19]

Bennett et al.

[11] Patent Number: 5,659,484
[45] Date of Patent: Aug. 19, 1997

[54] FREQUENCY DRIVEN LAYOUT AND METHOD FOR FIELD PROGRAMMABLE GATE ARRAYS

[75] Inventors: David Wayne Bennett, Louisville; Eric Ford Dellinger, Boulder; Walter A. Manaker, Jr., Boulder; Carl M. Stern, Boulder; William R. Troxel, Longmont; Jay Thomas Young, Louisville, all of Colo.

[73] Assignee: Xilinx, Inc., San Jose, Calif.

[21] Appl. No.: 434,794

[22] Filed: May 4, 1995

Related U.S. Application Data

[63] Continuation of Ser. No. 38,792, Mar. 29, 1993, abandoned.
[51] Int. Cl.[6] .................................................. G06F 17/50
[52] U.S. Cl. ........................ 364/491; 364/488; 364/489; 364/490
[58] Field of Search .................................. 364/488, 489, 364/490, 491; 340/825.83, 825.86, 825.87; 326/38, 39, 41, 47, 101

[56] References Cited

U.S. PATENT DOCUMENTS

| | | | |
|---|---|---|---|
| 3,617,714 | 11/1971 | Kernighan | 364/468 |
| 4,593,363 | 6/1986 | Burstein et al. | 364/491 |
| 4,630,219 | 12/1986 | DiGiacomo et al. | 364/488 |
| 4,924,430 | 5/1990 | Zasio et al. | 364/578 |
| 4,947,365 | 8/1990 | Masubuchi | 364/900 |
| 4,970,664 | 11/1990 | Kaiser et al. | 364/521 |
| 5,003,487 | 3/1991 | Drumm et al. | 364/489 |
| 5,036,473 | 7/1991 | Butts et al. | 364/489 |
| 5,053,980 | 10/1991 | Kanazawa | 364/578 |

(List continued on next page.)

OTHER PUBLICATIONS

Agrawal, V.D., "Synchronous Path Analysis in MOS Circuit Design," 19th Design Automation Conference, 1982, pp. 629–635.
Brown et al., "A Detailed Router for FPGAs", IEEE Trans. on Computer–Aided Design, vol. 11, No. 5, May 1992, pp. 620–628.
Donath et al., "Timing Driven Placement Using Complete Path Delays", 27th ACM/IEEE Design Automation Conference, 1990, pp. 84–89.

(List continued on next page.)

Primary Examiner—Kevin J. Teska
Assistant Examiner—Leigh Marie Garbowski
Attorney, Agent, or Firm—Blakely, Sokoloff, Taylor & Zafman; Holland & Hart; Jeanette S. Harms

[57] ABSTRACT

A device independent, frequency driven layout system and method for field programmable gate arrays ("FPGA") which allow for a circuit designer to specify the desired operating frequencies of clock signals in a given design to the automatic layout system to generate, if possible, a physical FPGA layout which will allow the targeted FPGA device to operate at the specified frequencies. Actual net, path and skew requirements are automatically generated and fed to the place and route tools. The system and method of the present invention evaluates the frequency constraints, determines what delay ranges are acceptable for each electrical connection and targets those ranges throughout the layout.

23 Claims, 15 Drawing Sheets

U.S. PATENT DOCUMENTS

| | | | |
|---|---|---|---|
| 5,095,454 | 3/1992 | Huang | 364/578 |
| 5,144,563 | 9/1992 | Date et al. | 364/491 |
| 5,168,563 | 12/1992 | Shenoy et al. | 395/500 |
| 5,187,784 | 2/1993 | Rowson | 395/500 |
| 5,197,015 | 3/1993 | Hartoog et al. | 364/490 |
| 5,210,700 | 5/1993 | Tom | 364/489 |
| 5,218,551 | 6/1993 | Agrawal et al. | 364/491 |
| 5,224,056 | 6/1993 | Chene et al. | 364/490 |
| 5,233,539 | 8/1993 | Agrawal et al. | 364/489 |
| 5,237,514 | 8/1993 | Curtin | 364/490 |
| 5,239,481 | 8/1993 | Brooks et al. | 364/486 |
| 5,239,493 | 8/1993 | Sherman | 364/578 |
| 5,251,147 | 10/1993 | Finnerty | 364/490 |
| 5,274,568 | 12/1993 | Blinne et al. | 364/489 |
| 5,329,460 | 7/1994 | Agrawal et al. | 364/489 |
| 5,329,470 | 7/1994 | Sample et al. | 364/578 |
| 5,498,979 | 3/1996 | Parlour et al. | 326/38 |
| 5,521,837 | 5/1996 | Frankle et al. | 364/491 |

OTHER PUBLICATIONS

Frankle, "Iterative and Adaptive Slack Allocation for Performance–driven Layout and FPGA Routing," 29th ACM/IEEE Design Automation Conference, pp. 536–542.

Schlag et al., "Empirical Evaluation of Multilevel Logic Minimization Tools for a Look–Up–Table–Based FPGA Technology," IEEE Trans on CAD of ICs and Systems, vol. 12, No. 5, May 1993, pp. 713–721.

Singh et al., "Optimization of FPGA Logic Block Architecture for Speed," IEEE 1991 Custom ICs Conference, pp. 6.1.1–6.1.6.

Agrawal, "Synchronous Path Analysis in MOS Circuit Simulator", 19th DAC, 1982 IEEE, pp. 629–635.

Burstein et al., "Timing Influenced Layout Design" 22nd DAC, 1985 IEEE, pp. 124–130.

Chan et al., "Architectural Tradeoffs in Field–Programmable–Device–Based Computing Systems," 1993 IEEE, pp. 152–161.

Luk, "A Fast Physical Constraint Generator for Timing Driven Layout," 28th ACM/IEEE DAC, 1991 ACM, pp. 626–631.

Teig et al., "Timing–Driven Layout of Cell–Based ICs" *VLSI Systems Design*, May 1986, pp. 63–73.

Hitchock, R., "Timing Verification and the Timing Analysis Program," Proceedings 19th Design Automation Conference, 1982, pp. 594–604.

Roth, J.P., "Diagnosis of Automata Failures: A Calculus and a Method," IBM Journal of Research and Development, Jul. 1966, pp. 278–291.

Du, D., Yen, S. and Ghanta, S., "On the General False Path Problem in Timing Analysis," Proceedings 26th Design Automation Conference, 1989, pp. 555–560.

Liu, L., Chen, H. and Du, D., "The Calculation of Signal Stable Ranges in Combinational Circuits," Proceedings ICCAD–91, 1991, pp. 312–315.

McGreer, P. and Brayton, R., "Efficient Alogrithms for Computing the LongestViable Path in a Combinational Network," Proceedings 26th Design Automation Conference, 1989, pp. 561–567.

Stewart, R. and Benkoski, J., "Static Timing Analysis Using Interval Constraints," Proceedings ICCAD–91, 1991, pp. 308–311.

Xilinx, Inc., "Programmable Gate Array Data Book," Xilinx, Inc., 1992, pp. 6–13.

Rubenstein, J., Penfield, P. and Horowitz, M., "Signal Delay in RC Tree Networks," IEEE Transactions on Computer–Aided Design, vol. CAD–2, No. 3, Jul. 1983, pp. 202–211.

Bening, L.C., Alexander, C.R., and Lane, T.A., "Developments in Logic Network Path Delay Analysis," Proceedings 19th Design Automation Conference, 1982, pp. 605–615.

Jackson, M.A.B. and Kuh, E.S., "Performance–Driven Placement of Cell Based IC's," Proceedings 26th Design Automation Conference, 1989, pp. 370–375.

Youssef, H. and Shragowitz, E., "Timing Constraints for Correct Performance," Proceedings ICCAD–90, 1990, pp. 24–27.

Frankle, J., "Integrating Path Analysis with Physical Design," SIGDA Newslwtter, vol. 21, No. 3, p. 35.

Malgorzata Marek–Sadowska and Shen P. Lin, "Timing Placement," Proc. of ICCAD '89, pp. 94–97,1989.

J. Garbers, B. Korte, H. J. Promel, E. Schwietzke, A. Steger, "VLSI–Placement Based on Routing and Timing Information," Proc. of the European Design Automation Conference, pp. 317–321, 1990.

Michael A. B. Jackson, Arvind Srinivasan, E. S. Kuh, "A Fast Algorithm for Performance–Driven Placement," proc. of ICCAD '90, pp. 328–331, 1990.

Arvind Srinivasan, "An Algorithm for Performance–Driven Initial Placement of Small–Cell ICs," Proc. of the 28th Design Automation Conference, pp. 636–639, 1991.

Ren–Song Tasy, Juergen Koehl, "An Analytic Net Weighting Approach for Performance Optimization in Circuit Placement," Proc. of the 28th Design Automation Conference, pp. 620–625, 1991.

Robert B. Hitchcock, Sr., Gordon L. Smith, David D. Cheng, "Timing Analysis of Computer Hardware," IBM J. Res. Develop., vol. 26, No. 1, pp. 100–105, 1982.

Vishwani D. Agrawal., "Synchronous Path Analysis in MOS Circuit Simulator," 19th Design Automation Conference, Paper 35.4, pp. 629 through 635, 1982.

Michael A.B. Jackson and Ernest S. Kuh, "Performance–Driven Placement of Cell Based IC's," 26th ACM/IEEE Design Automation Conference, Paper 24.2, pp. 370 through 375, 1989.

Jorge, Rubinstein, Paul Penfield, Jr., and Mark A. Horowitz, "Signal Delay in RC Tree Networks," IEEE Transactions on Computer Aided Design, vol. CAD–2, No. 3, pp. 202 through 211, Jul. 1983.

Steven Teig, Randall L. Smith, and John Seaton, "Timing–Driven Layout of Cell Based ICs," VLSI Systems Design, pp. 63 through 73, May 1986.

Habib Youssef, Eugene Shragowitz, "Timing Constraints for Correct Performance," pp. 24–27, 1990 IEEE.

H. Youssef, "Timing Analysis fo cell Based VLSI Designs," Computer and Information Sciences, University of Minnesota, Ph.D. Thesis, Jan. 1990.

Suphachai Sutanthavibul, E. Shragowitz, "Dynamic Prediction of Critical Paths and Nets for Constructive Timing–Driven Placement," 28th ACM/IEEE Design Automation Conference, Paper 37.4, pp. 632–635, 1991.

B. W. Kernighan and S. Lin, "An Efficient Heuristic Procedure for Partitioning Graphs," The Bell System Technical Journal, pp. 291–307, Feb. 1970.

Neil R. Quinn, Jr., and Melvin A. Breuer, "A Force Directed Component Placement Procedure for Printed Circuit Boards," IEEE Transactions on Circuits and Systems, vol. CAS–26, No. 6, pp. 377–388, Jun. 1979.

Peter S. Hauge, Ravi Nair, Ellen J. Yoffa, "Circuit Placement for Predictable Performance," Proc. of ICCAD '87, pp. 88–91, 1987.

A. E. Dunlop, V. D. Agrawal, D. N. Deutsch, M. F. Jukl, P. Kozak, M. Wiesel, "Chip Layout Optimization Using Critical Path Weighting," 21st Design Automation Conference, Paper 9.2, pp. 133–136, 1984.

Stephen D. Brown, Jonathan Rose, and Zvonko G. Vranesic, "A Stochastic Model to Predict the Routability of Field–Programmable Gate Arrays," IEEE Trans. on CAD of ICs and Systems, vol. 12, No. 12, pp. 1827–1838, Dec. 1993.

Norman P. Jouppi, "Timing Analysis for nMOS VLSI," 20th Design Automation Conference, Paper 27.3, pp. 411–418, 1983.

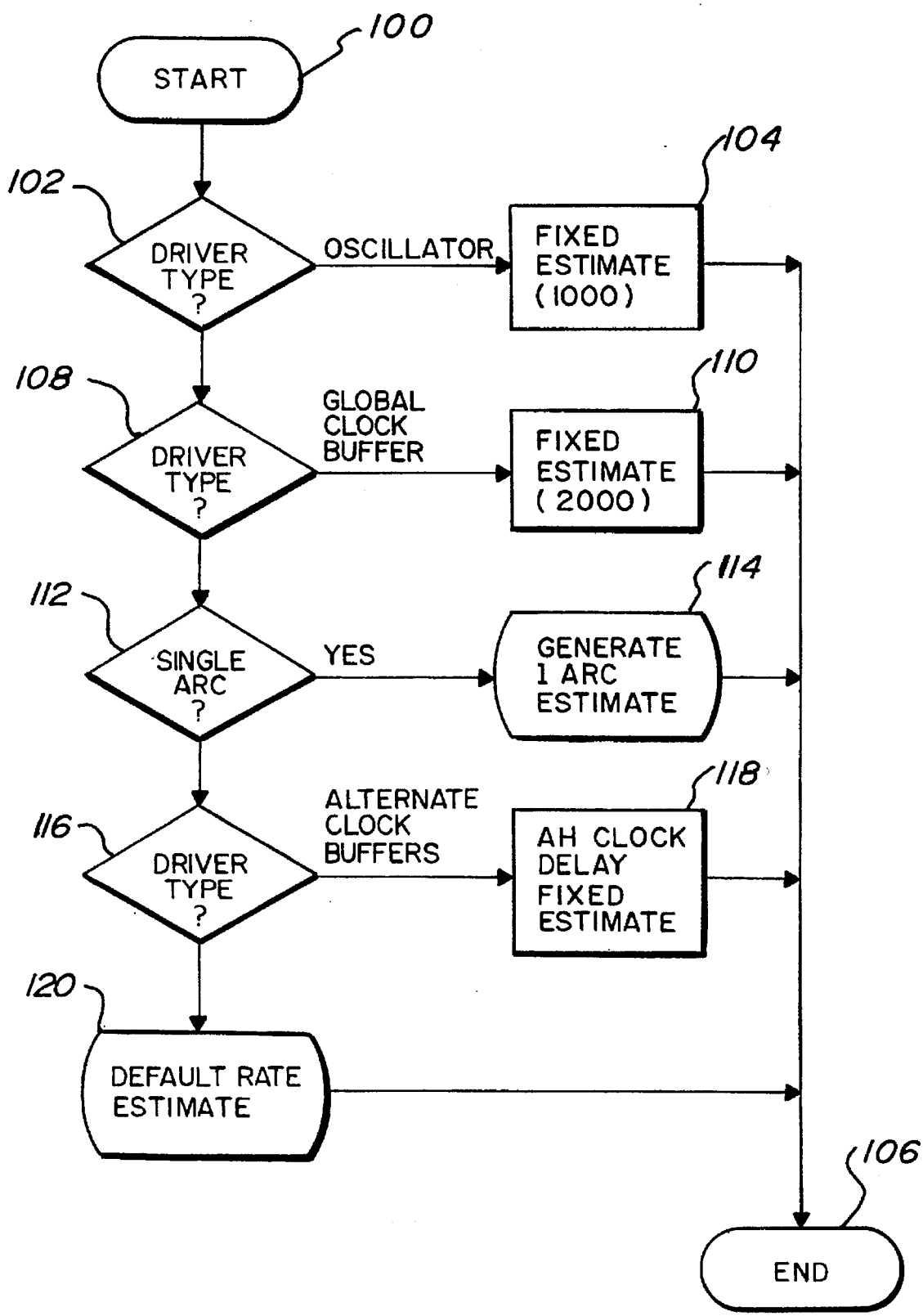
Fig_4a

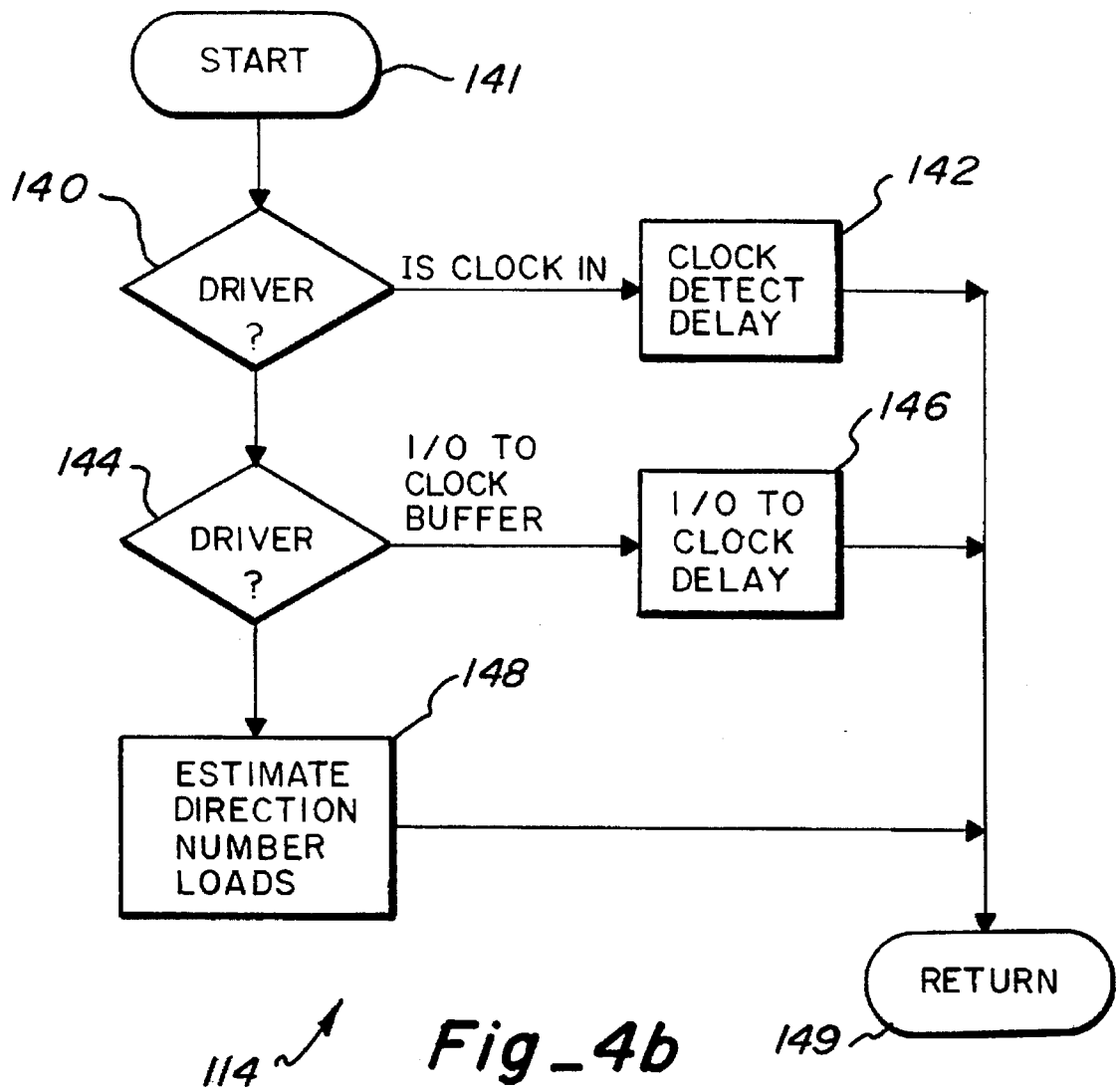
Fig_4b

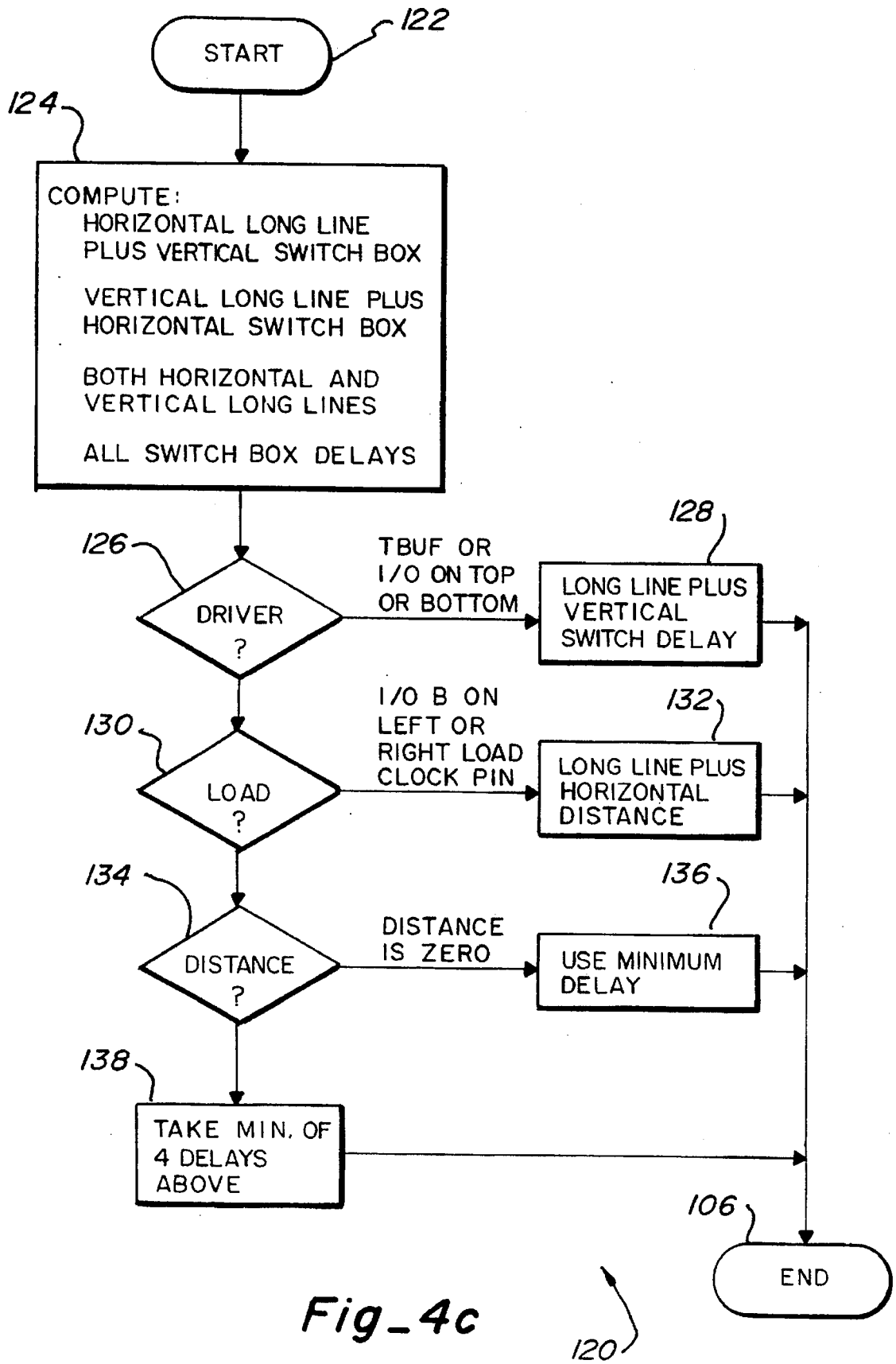
Fig_4c

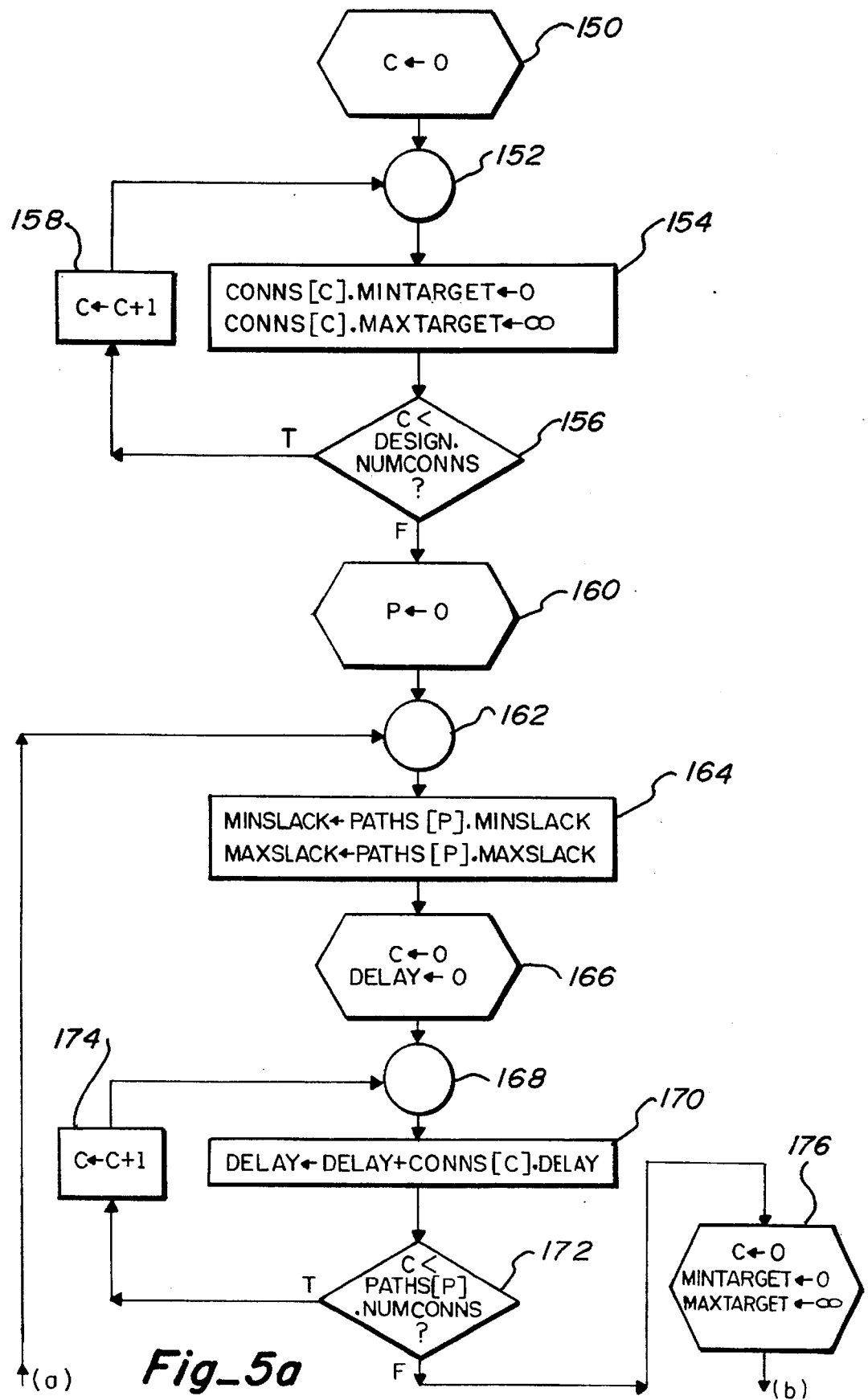
Fig_5a

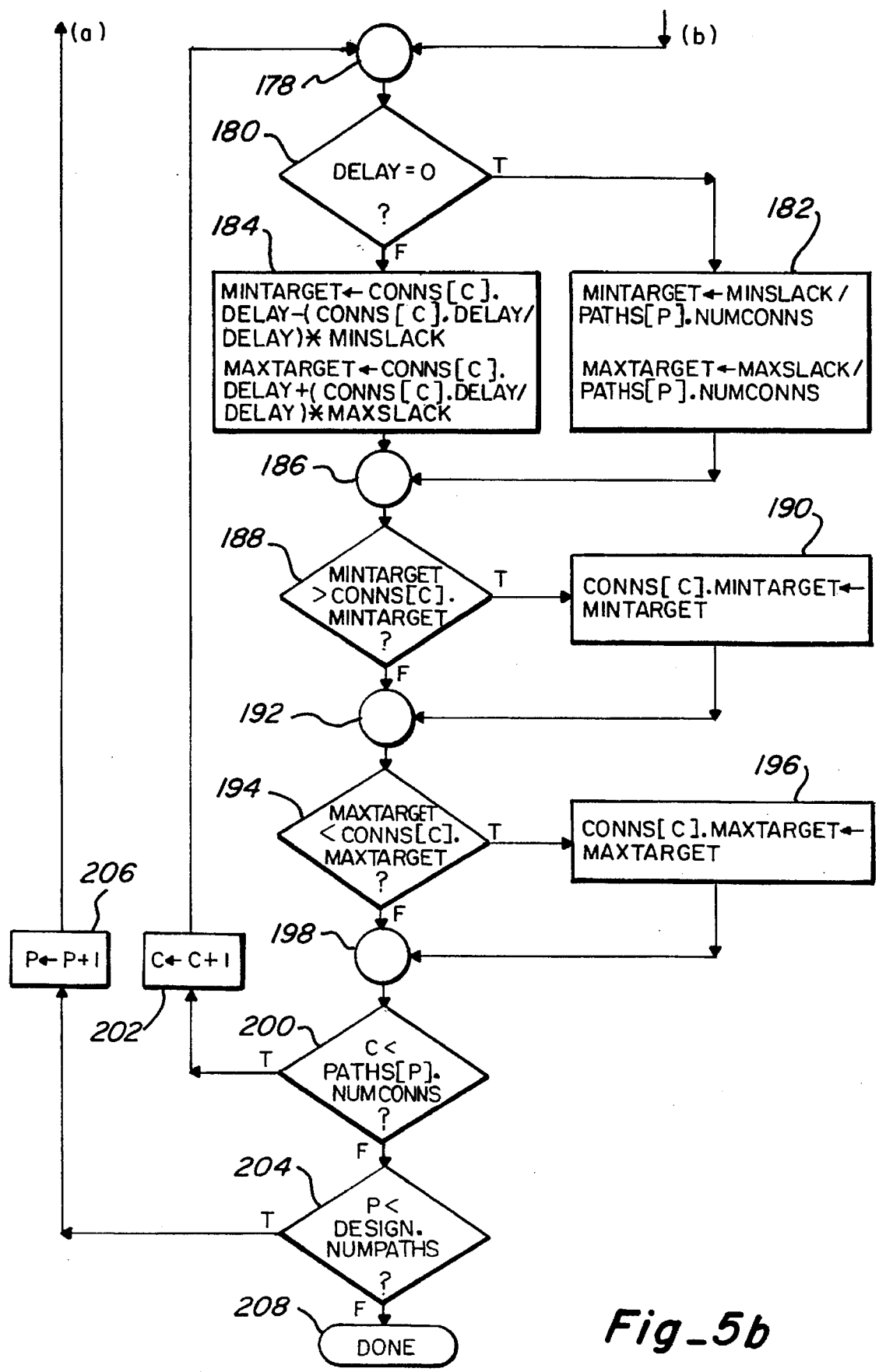
Fig_5b

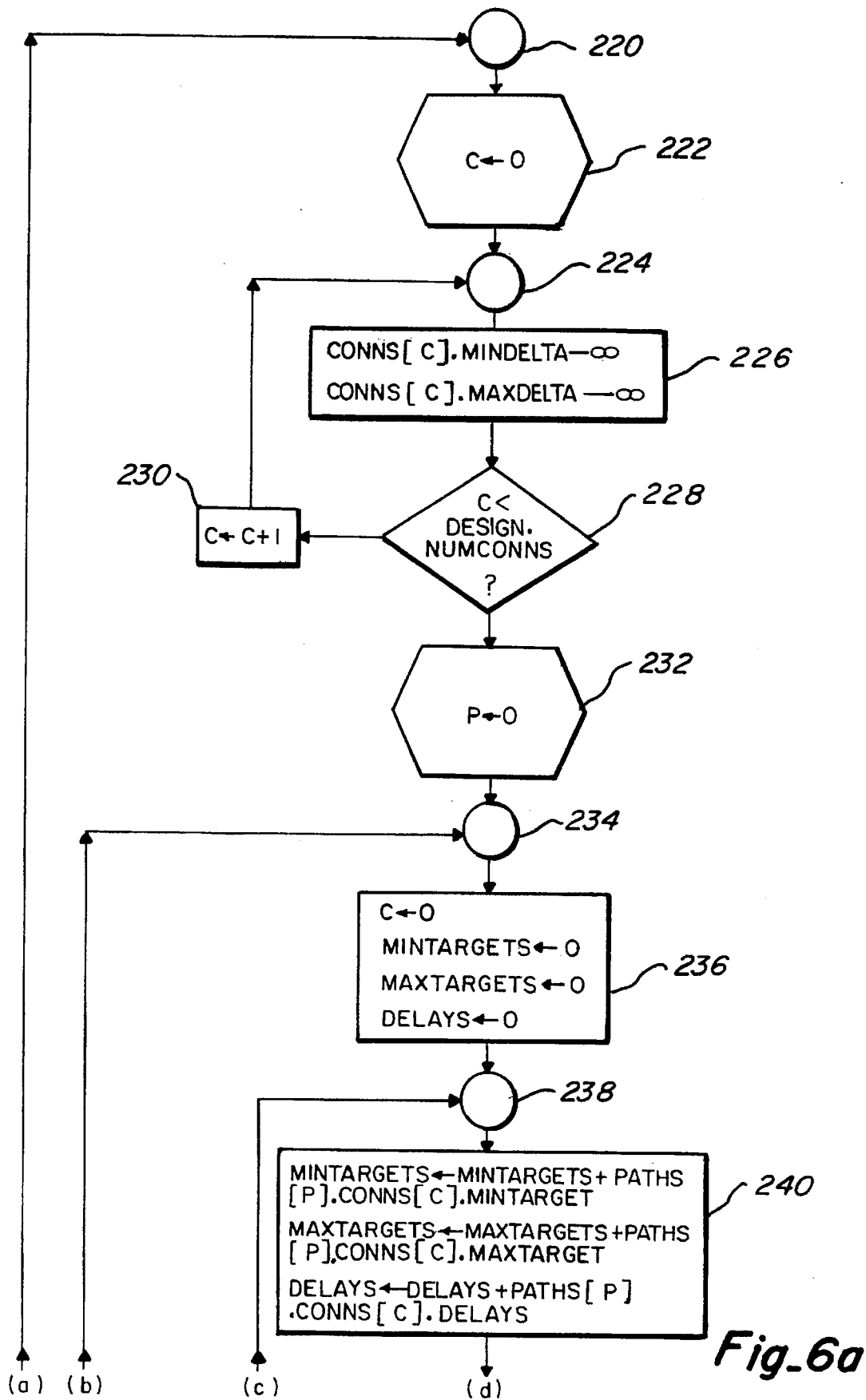
Fig_6a

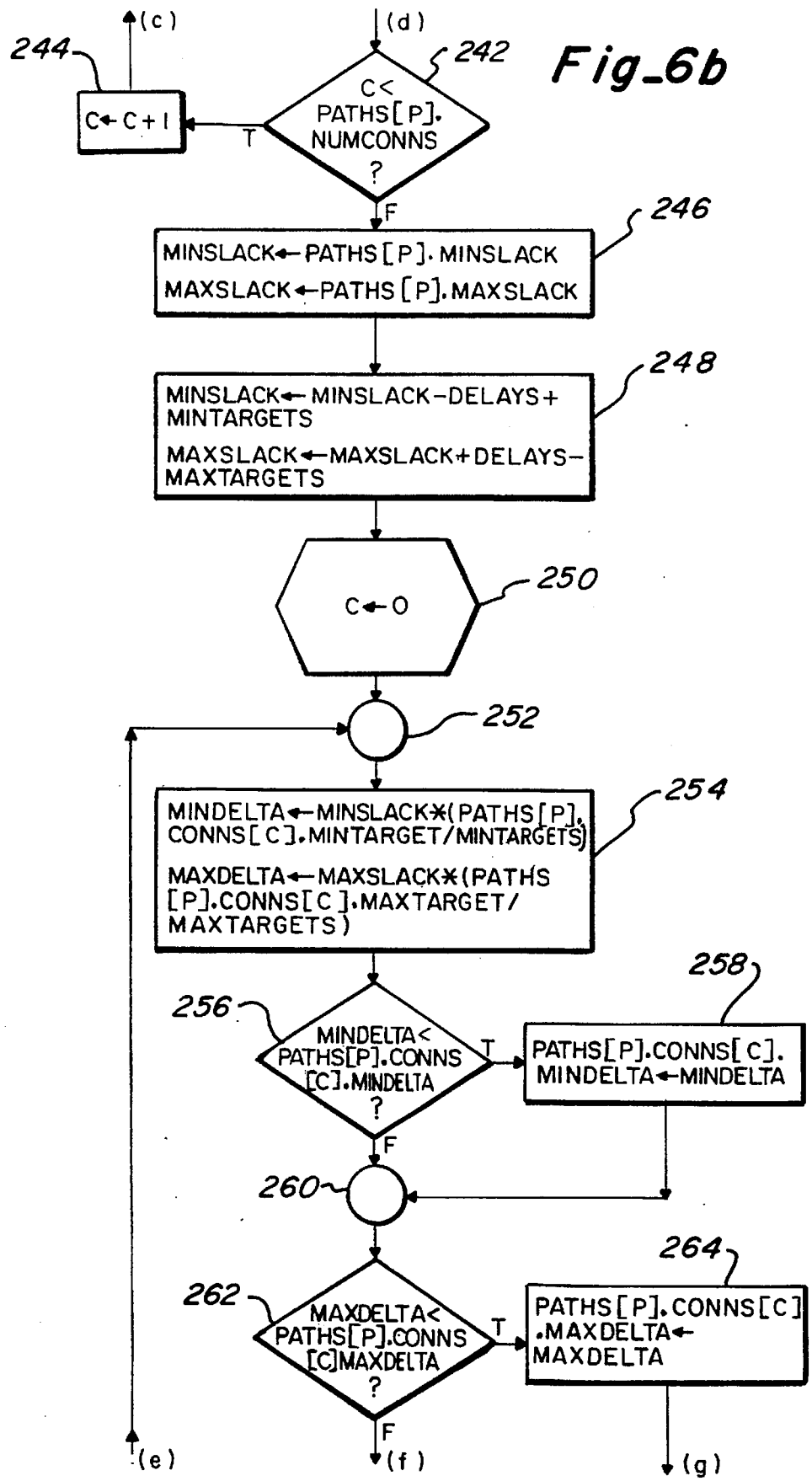
Fig_6b

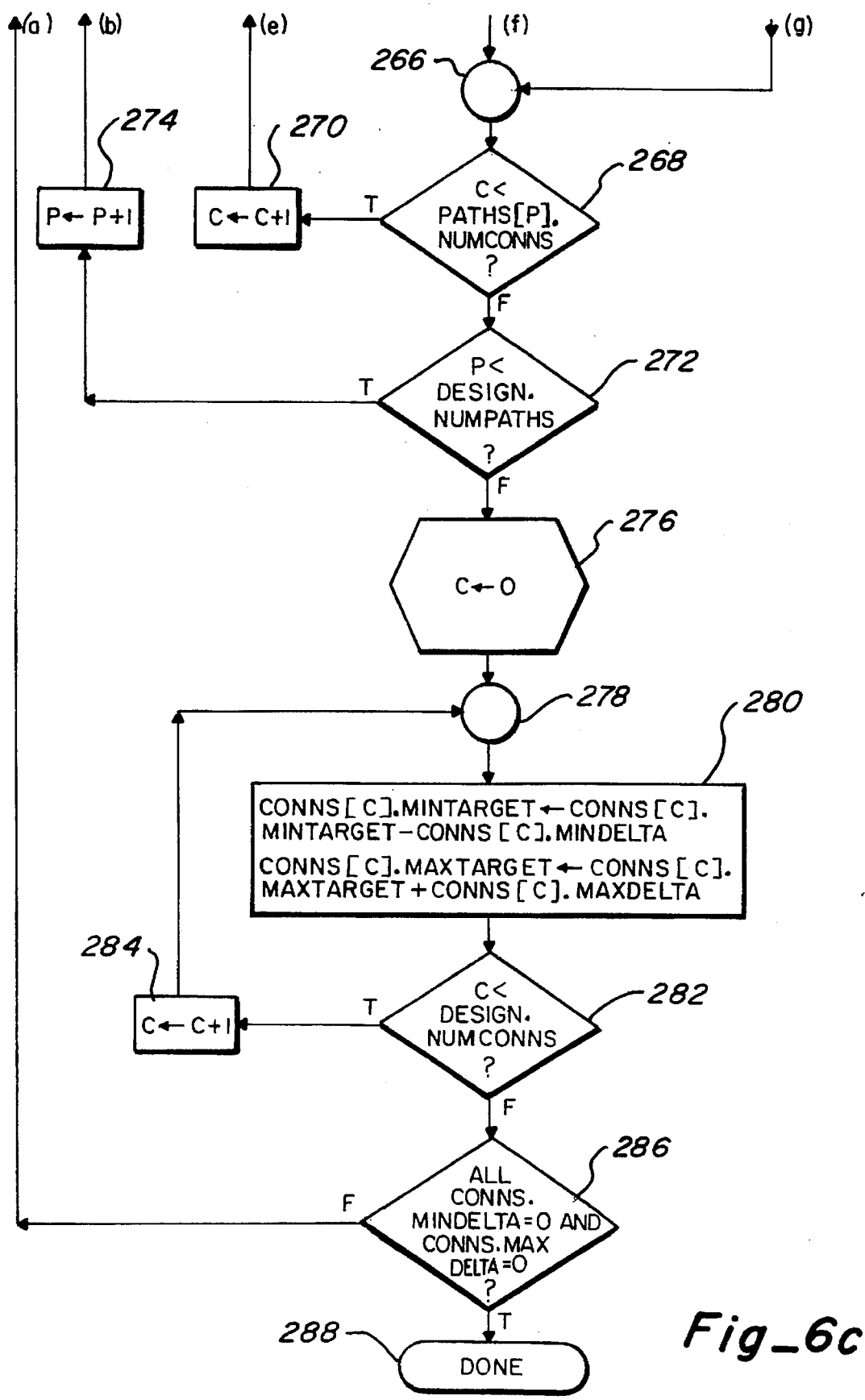
Fig_6c

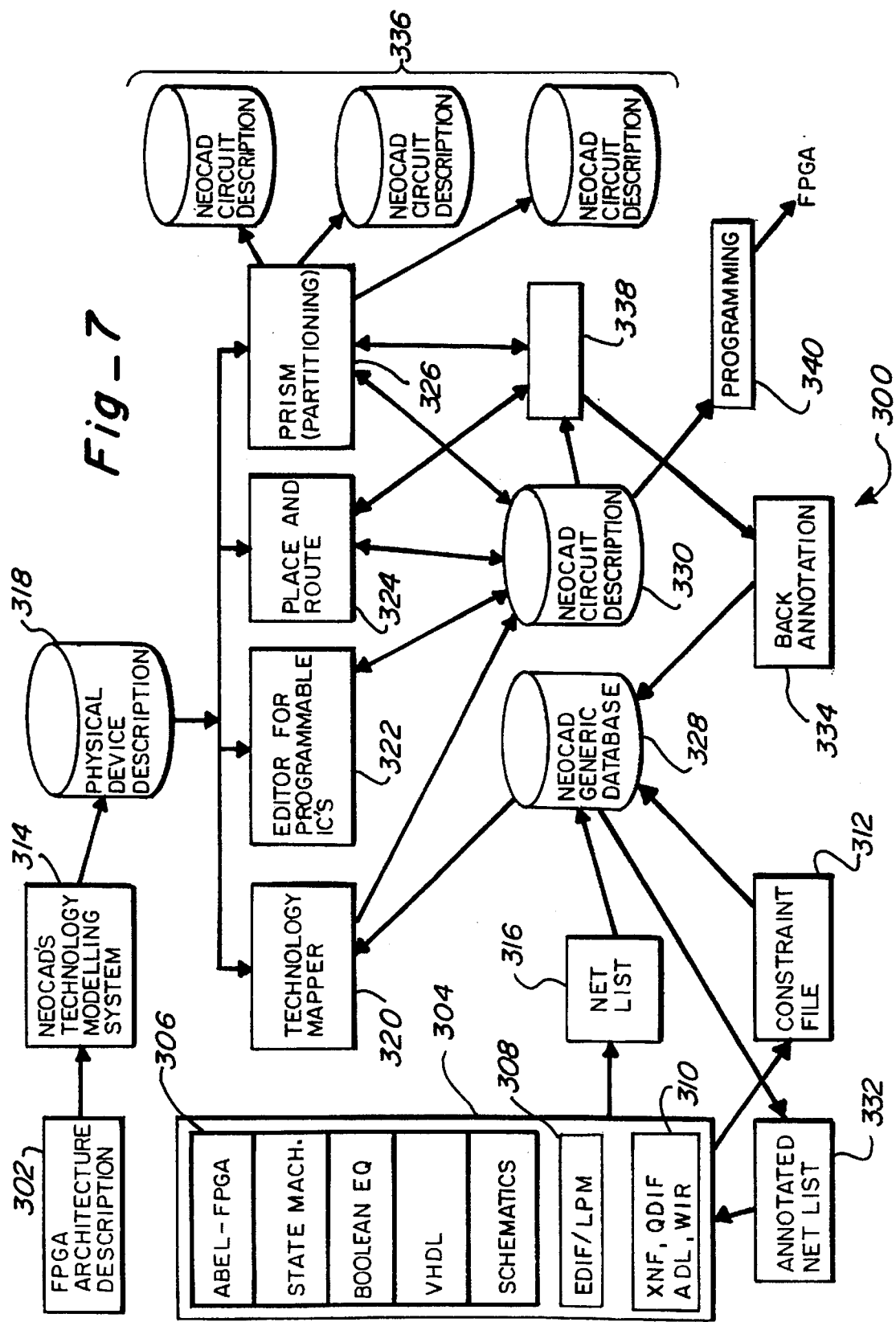
Fig_7

FREQUENCY DRIVEN LAYOUT AND METHOD FOR FIELD PROGRAMMABLE GATE ARRAYS

This is continuation of application Ser. No. 08/038,792, filed Mar. 29, 1993 and now abandoned.

BACKGROUND OF THE INVENTION

The present invention relates, in general, to a device-independent, frequency-driven layout system and method for field programmable gate arrays ("FPGA"). More particularly, the present invention allows an FPGA circuit designer to specify the desired operating frequencies of clock signals in the FPGA design to the frequency-driven layout system of the present invention which will then, if possible, generate a physical layout for the device that will allow it to operate at the specified frequencies. Actual net, path and skew requirements are automatically generated and fed to the place and route tools. This is effectuated by evaluating the frequency constraints, determining what delay ranges are acceptable for each electrical connection and targeting those ranges throughout the layout synthesis.

Field programmable gate arrays ("FPGA") are a relatively new technology, first introduced by Xilinx, Inc. in 1985. An FPGA consists of cells which can be programmed to perform a variety of logical functions and programmable interconnects to connect the logic cells in a general way. The cells and interconnects are used to implement complex logical circuits. The use of FPGA's continues to grow at a rapid rate due to their relatively shorter design cycles, reduced cost through logic consolidation and the flexibility offered by their re-programmability. With an FPGA's inherent flexibility also comes additional timing problems not encountered, for example, in the use of gate arrays due to the fact that an FPGA uses programmable switches having inherently less predictable and greater delay characteristics, fixed interconnect resources and logic cells which are generally coarser than other types of programmable devices.

However, despite the advantages offered by FPGA's, one of the significant shortcomings of the devices is their limited speed. Utilizing the automatic map place and route tools provided by the FPGA manufacturers themselves, designs implemented in today's technology typically can achieve maximum operating frequencies of only about 30 to 40 Mhz. Nevertheless, even though the devices continue to attain faster operating speeds due to improved process technology, many of today's board level designs require operating frequencies in the 50 to 100 Mhz range. Moreover, competing technologies such as programmable logic devices ("PLD") and gate arrays are likewise becoming faster.

Previously, designers have attempted to maximize chip performance by becoming so knowledgeable in a particular device's architecture and proficient at designing in that particular device, that through meticulous design capture and manual place and route, the designers were able to do a more effective job of programming than with the use of the automatic tools provided by the FPGA manufacturer. Nevertheless, as such devices become larger and inherently more complex, it is increasingly more difficult to do the design manually. Moreover, with the introduction of additional FPGA's from still other manufacturers, whole new architectures are presented, each with its own unique strengths and weaknesses. It is, therefore, becoming increasingly difficult for a designer to become expert in working with each of the many different available designs.

Typically, the process for implementing a design in an FPGA begins with the device selection. In this regard, the designer typically attempts to maximize the efficiency of his implementation by careful selection of the device, given its inherent limited size and speed. The second primary step is termed "design capture" and the vast majority of FPGA designs are "captured" utilizing schematics. Alternative design capture techniques include programmable array logic/programmable logic device ("PAL/PLD") behavioral languages such as Abel and Palasm and hardware description languages such as VHDL and Verilog. Functional simulation follows design capture. However, simulation of the actual timing cannot be done because the design exists only in terms of a logical representation and there is no physical information available on which to base the functional simulation.

The next step in the design process is the mapping of the design into the target device. Mapping, or "fitting" is that stage of the design in which the logical information is converted into the technology-specific components unique to the physical device targeted for implementation; that is, the logic blocks within a particular FPGA. Some device specific optimization can occur at this point and some designers wait until after mapping to do the above-described functional simulation thereby allowing them to do some preliminary timing simulation at the same time, even though, until place and route is complete, the only timing information available are the component delays.

Once the design has been converted into the logic blocks available within the specific targeted device, they must be placed and routed. This is typically a lengthy phase of the design process and, unlike gate arrays, FPGA's are fixed in size and if the design does not automatically place and route to completion, getting it to fit within the targeted device can prove to be very difficult. It is also important to understand that even a completely routed design can still be a long way from a working design. Getting the timing inside the targeted device to work properly, and at the desired operating frequency, is typically the most time consuming, and error prone, part of the design process.

Current design techniques include following the routing of all the connections with timing analysis or timing simulation (or a combination of both techniques) in order to find the problems that would keep the device from running at the desired operating frequency. This is an iterative process as the designer runs timing analysis (or simulation), finds and fixes a problem, runs timing analysis again to find the next problem and so on, until the design works. Other techniques which designers may implement include using static random access memory ("SRAM") based devices to build a prototype board to aid in identifying timing problems and then fixing them at lower operating speeds, raising the speed a notch, finding and fixing new problems and so on, until the desired operating frequency is obtained.

The inherent flexibility of FPGA's makes them more susceptible to timing problems than other technologies such as PAL's, PLD's, gate arrays and standard cells. For example, because of the more varied logic blocks used in FPGA's, (as compared to the relatively fine-grain elements utilized in gate arrays), without good device-specific optimization, logic functions may not be efficiently implemented to the particular architecture being used thereby resulting in extra delays through potentially critical paths. This problem is especially acute with relatively coarse-grain architectures such as AT&T's ORCA and Xilinx's 3,000/4000 Series devices. The number of permutations of logic elements within these devices is so great that current synthesis tools simply do not work, and in general, special mapping algorithms must be developed.

Another difficulty encountered in the programming of FPGA's is that the average interconnect delays within the typical device are greater than those on an associated printed circuit board ("PCB") or gate array, making it difficult to obtain perfectly synchronized timing while at the same time creating a higher penalty for poorly routed connections. The heterogeneous interconnect resources of the aforedescribed Xilinx devices, or the ability to route through logic blocks and architectures such as is found in Pilkington and Concurrent devices further complicates the situation. These unique FPGA characteristics make it particularly difficult to get all devices timing optimized, as the delay on any particular path can change significantly depending on which route is taken. This commonly results in skew and setup-and-hold violations.

Another problem encountered in programming FPGA's is that there may simply not be sufficient routing resources of the proper type to readily implement the design. Problems may be encountered in finding adequate routing resources such as dedicated clock lines or interconnects which can handle wide fanout circuitry with minimal delay variances. As has been previously described, interconnect resources within FPGA's are both fixed and relatively limited. In fact, the larger devices currently available are even more susceptible to these type of problems due to the increased demand placed upon them for global interconnect resources.

Further, the limited operating speeds of current FPGA's provide additional constraints forcing programmers to find alternative techniques for optimizing the devices for their maximum operating frequencies. As has been described, obtaining the maximum operating speed of a particular device is important, while at the same time, FPGA's are particularly susceptible to timing problems which affect the ability to obtain this desired performance. While the most important single step in implementing an FPGA design is choosing the proper device based upon its size, speed and architecture, most of the time spent in designing a working device is spent in getting the device timing to work.

Therefore, it can been seen that there are two primary ways to shorten FPGA design cycles. That is, one can either shorten the time it takes to get through the process of mapping, optimization, placement, routing, timing analysis and programming and/or reduce the number of times that one needs to go through that process to get working results. Typically, the design flow of a FPGA device comprises an iterative process of laying out the design, checking the timing using timing analysis and/or timing simulation, making changes to the layout and then rechecking the timing. Inherent in this iterative process is that changing the layout in one part of an FPGA in an attempt to fix a particular timing problem can easily cause a concomitant timing problem to appear somewhere else in the design.

Therefore, an optimal solution to these problems is the ability to set timing requirements up front and then have the design tools automatically meet them during implementation. Such a "timing-driven" approach shortens the design cycle by eliminating the need to run multiple iterations of place and route, or having to resort to manual "tweaking" of the design in an attempt to repair timing problems and maximize operating frequency. Moreover, having the ability to set timing requirements up front allows all critical nets of the device to be constrained by these timing requirements and, therefore, changes can be made to the design without causing concomitant timing problems elsewhere in the device. The ability to deal with timing issues dynamically, during placement and routing, allows the designer to shorten design cycles significantly.

In order for the design process of a FPGA to be truly timing-driven, two criteria must be met5 First, the designer has to be able to specify the exact timing requirements up front, before the automatic design tools are engaged. Next, the automatic tools (mapping/placement/routing) have to be designed to complete their task while simultaneously adhering to the timing rules as input by the designer. Therefore, timing requirements, such as clock frequency, offset (the off-chip timing relationships between clock and data signals), and external setup/hold times should be considered along with physical constraints like package type and pinout assignments early in the design process. Because most of the timing requirements will be in terms of the logical design, such need first be converted into constraints that the physical implementation tools can relate to, such as specific paths, nets and maximum skew, before being handed off to the mapping, placement and routing routines. In general, FPGA programming can be broken down into four steps comprising technology mapping/optimization, placement, routing and programming.

With regard to the mapping/optimization step of FPGA programming, there are at least three different approaches. First, the optimization algorithms may be "fixed" and make pre-set tradeoffs between device area and speed. (Typically, optimizing for speed entails "flattening" the hierarchy of the circuitry, but this usually results in the circuitry taking up more space or area). Alternatively, the designer may be provided with control over whether the mapper optimizes more for area or more for speed. Finally, the mapper may be truly "timing-driven" although typically the only timing evaluation which may take place is component delays, since when there is no placement and routing information from which to determine interconnect delays, such cannot be considered.

The second step of FPGA programming is placement, and while speed enhancing mapping algorithms can provide incremental improvements over a solution which only provides timing-driven placement and timing-driven routing, a timing-driven mapping capability without timing-driven place and route will prove insufficient. Currently, the state of the art in FPGA design tools has relied on a process called "delay-based cleanup" to reduce overall interconnect delays. With delay-based cleanup, the designer is only allowed to enter net/signal priorities (that is, signal A has a higher priority than signal B). Such tools provide no capability to enter specific, detailed timing requirements and thus, such tools cannot possibly meet timing requirements because they have never been specified. Basically, a cleanup pass is run after the design has been routed to 100% completion with the tools attempting to reduce the average delay of all nets in the design. Among the disadvantages of such delay-based cleanup techniques is that the tools do the same thing each time, and as an example, high priority nets are always routed first, regardless of the results. Further, the tools don't necessarily balance the use of available resources, and some nets may be "faster" than they need to be only because they were routed first and, therefore, use up valuable routing resources that were not really needed, while others may not be fast enough. Finally, not enough information is provided for the tools to act intelligently, and there is no way for them to report back whether they have balanced the use of available resources or where potential problems may exist.

Utilizing truly timing-driven techniques, the designer may specify exact timing constraints for all paths, nets, skew and so forth (as an example, all points on signal A must be under 15 nanoseconds, and the clock skew for net X must be under 3 nanoseconds). Among the many advantages to utilizing a truly timing-driven technique is that the tools would then have the necessary information with which to attempt to balance the use of available resources and allow them to work on the problems until all input requirements are met. Further, potential timing problems are, therefore, addressed up front, as opposed to the numerous iterations required to find and fix problems after layout of the FPGA is complete. This significantly shortens the design cycle and aids in eliminating the possibility of creating a new problem somewhere else on the device while attempting to fix an existing one. Moreover, when properly implemented, true timing-driven capability would preclude the unnecessary ripping up of acceptably placed and routed circuitry as changes are made to the design, thereby also shortening the design cycle. While there are numerous advantages to timing-driven approaches, it is nevertheless incumbent upon the designer to know, up front, his exact timing requirements and to assign them specifically and correctly to the appropriate paths and nets. Depending on the design and size of the device, this could include anywhere from several dozen to several hundred signals.

Therefore, it would be highly desirable to provide an FPGA designer with the benefits of true timing-driven techniques while allowing him to specify his requirements in high-level terms such as frequency and offset. Such would then result in a "frequency-driven" design technique where actual net, path and skew requirements would then be automatically generated and passed to the place and route tools. Therefore, a frequency-driven design approach would provide all of the same benefits as a timing-driven approach, but would allow the input of merely a single preference (such as clock frequency) and the system would automatically generate and assign constraints to the literally thousands of signals on the device automatically, relieving the designer of the difficult task of manually identifying the paths and signals and the exact timing requirements himself. Moreover, since all potentially critical paths in the device are then automatically assigned constraints, the tools have the requisite information to analyze and optimize the design for best results. Balancing timing between multiple different paths at the same time requires the manipulation of large amounts of data while simultaneously solving equations.

In order to effectuate such a "frequency-driven" design, timing analysis must be integrated into the total timing/frequency-driven solution such that analysis can be run using the designer's original input constraints/preferences as the measurement criteria. Such timing analysis functionality, when combined with the detailed and accurate set of timing constraints needed to achieve a desired operating frequency, allows for a technique which can pinpoint exactly where an implemented design has failed to meet the designers specified timing requirements as well eliminating the problems inherent in the conventional approach of manually sorting through vast amounts of data to pinpoint such problems.

SUMMARY OF THE INVENTION

Disclosed herein is a frequency-driven layout system and method for an FPGA which allows for automatic conversion of operating frequency and offset information input by the designer or otherwise passed from high-level synthesis tools. The system and method of the present invention utilizes specially designed timing analysis techniques to analyze the circuit and identify circuit paths and associated maximum delays needed to operate at a target frequency. This information is then converted into a set of constraints and rules which are used by the placement and routing functions. Moreover, false path elimination may be performed in order to preclude the placement and routing tools from wasting resources and meeting timing constraints that are not actually required.

During the technology mapping stage of the FPGA programming process, the system and method of the present invention optimizes for device speed versus device area using a separate predetermined balance of these two offsetting attributes depending upon the unique device architecture incorporated into a given manufacturers FPGA. Importantly, the system and method of the present invention allows for delay prediction during the placement stage of the FPGA programming process. Before an FPGA is routed, there are no actual delays to calculate and the path delays resulting from a particular placement must be predicted. Unlike gate arrays in which all interconnect resources are homogeneous, FPGA's exhibit a wide variety of interconnect resources such as direct connects, general purpose local interconnects, long lines, PIPs, switch boxes, and tri-state buffers or their equivalents in other nomenclature. Such non-homogeneous resources make it extremely difficult to predict the final routing delay for any particular placement.

The system and method of the present invention also provide for timing analysis during the routing stage of the FPGA programming process. Unlike the placement stage where estimates of timing implications associated with a particular action may be utilized, during routing, true timing analysis may be implemented. However, it is important to note that the execution time and memory requirements are critical issues in any solution as only a finite amount of time and memory are ever available. The timing analysis function of the system and method of the present invention is accurate and extremely fast and is automatically run on every connection that is considered during routing with the result that the timing analysis routine can be run literally thousands of times during a single auto-routing session.

Still further, the system and method of the present invention allows, through the availability of its particular functionality, to confirm that a designers timing requirements have either been met or the exact locations and types of timing problems encountered, such that the design may be modified or a faster target device selected.

Disclosed herein is a layout system and process for constructing an electronic circuit from a programmable logic device, the device including a plurality of programmable logic cells having programmable interconnects therebetween. The system includes means for mapping the circuit into logical elements capable of implementation by the device logic cells. Means are provided for specifying timing preferences for the device to determine path delay requirements, whereupon a path enumeration is performed for the circuit. Means are also provided for calculating an actual path delay for existing routing and an estimated path delay for proposed routing. Means are further provided for assigning a maximum route delay for each connection based upon the actual or estimated path delays in the enumerated path to provide an indication of whether the maximum route delay exceeds or falls short of the path delay targets. Further provided are means for dynamically, during the placement and routing process, transforming the enumerated path to increase or decrease the actual or estimated path delays to the maximum route delay and reestimating the transformed path delay.

Further disclosed is a system and process for constructing an electronic circuit having predetermined operational frequency constraints from a programmable logic device, wherein the logic device includes a plurality of programmable logic cells having programmable interconnects therebetween. The process comprises the steps of converting the operational frequency constraints to timing requirements of the logic device and identifying paths of the interconnects between selected logic cells of the logic device for implementing the electronic circuit. Maximum delays of the paths are computed for meeting the timing requirements and the computed maximum delays of the paths are converted to a set of timing constraints. Logic blocks of the electronic circuit are placed within specific logic cells of the logic device, within the set of timing constraints, and the interconnects between the specific logic cells are also selectively routed within the set of timing constraints. Adherence of the paths and specific logic cells to the set of timing constraints is then verified.

Utilizing the frequency-driven layout system and method of the present invention, timing requirements may be addressed during the placement and routing of an FPGA as opposed to attempting to fix timing problems after the chip is routed. This can result in very significant time savings in the design cycle of a large FPGA. In fact, the time savings increases with the complexity of the design and, with current industry trends toward larger, more complex chips, timing problems within such devices become increasingly more difficult to find and to fix rendering conventional methods more completely ineffectual and inefficient. Further, the frequency-driven layout system and method of the present invention allows for significant increase in the overall clock speed of a given FPGA despite the greater number of critical timing requirements and the increase in placement and routing options available in increasingly larger FPGA devices. Moreover, the frequency-driven layout system and method of the present invention allows FPGA designers to obtain maximum performance from a given device architecture without the necessity of becoming intimately familiar with the internal architecture, such that one would have to know the exact timing requirements of the design and assign them specifically and correctly to the appropriate paths and nets in the device.

BRIEF DESCRIPTION OF THE DRAWINGS

The above mentioned and other features and objects of the present invention and the manner of attaining them will become more apparent, and the invention itself will be best understood by reference to the following embodiment of the present invention taken in conjunction with the accompanying drawings wherein:

FIGS. 4a–4c are a block diagram illustrative of the basic connection delay estimate logic flow of the system and method of the present invention;

FIGS. 5a–5b are a logic block diagram illustrative of the compute connection targets logic flow of the system and method of the present invention;

FIGS. 6a–6c are a logic block diagram illustrative of the relax connection targets logic flow of the system and method of the present invention;

FIG. 7 is a functional block diagram illustrating the design flow for programming an FPGA utilizing the system and method of the present invention.

DESCRIPTION OF A PREFERRED EMBODIMENT

Figure 1:
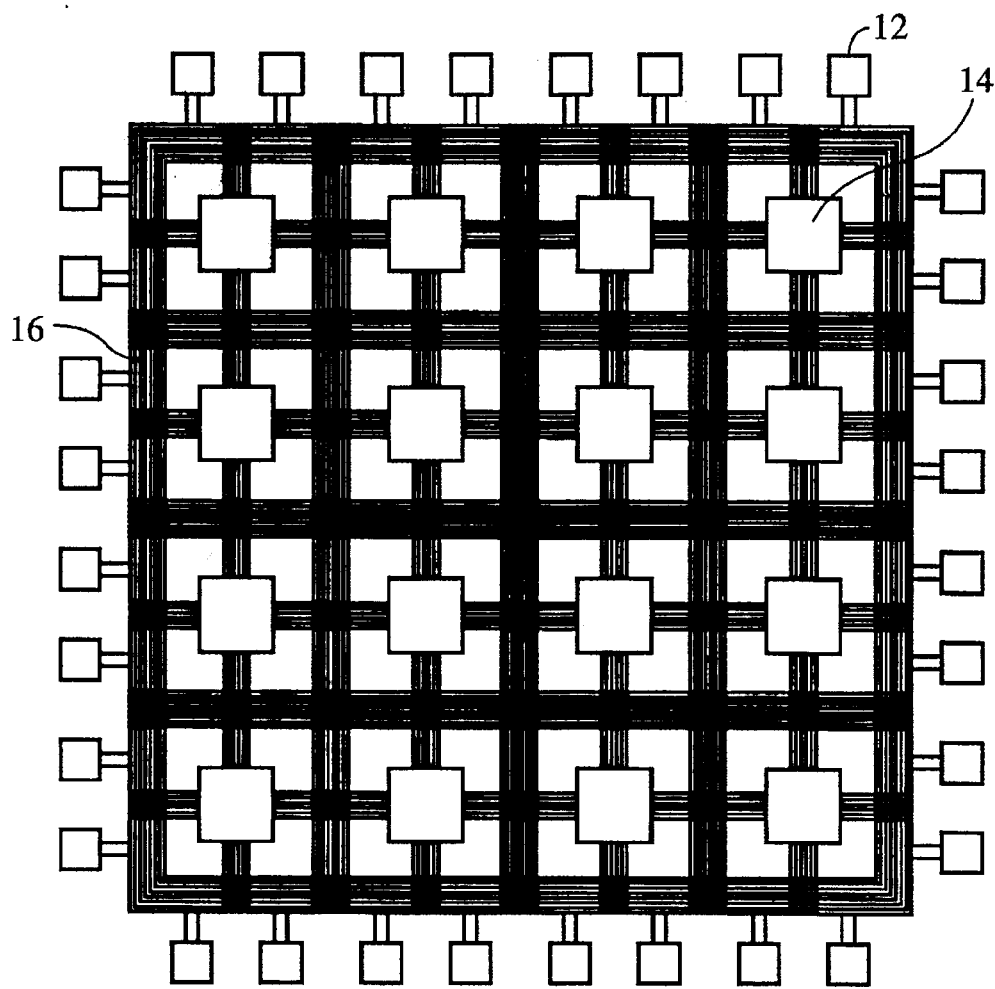
FIG. 1 is a conceptual, schematic diagram of a typical FPGA device illustrating the provision of a number of logic blocks and programmable interconnection resources thereof.

Referring now to FIG. 1, a conceptual field programmable gate array ("FPGA") 10 is shown. Conceptual FPGA 10 includes a number of logic blocks 14 and input/output ("I/O") cells 12. Logic blocks 14 and I/O cells 12 may be programmably interconnected to perform defined logic functions by means of programmable interconnection resources 16. Interconnection resources 16 may comprise direct connects, general purpose local interconnects, long lines, PIPs, switch boxes and/or tri-state buffers as such may be described in a particular FPGA 10 manufacturer's nomenclature.

There are four primary steps in programming conceptual FPGA 10 with a specific circuit implementation. The first is technology mapping/optimization, which decomposes the circuit into smaller, logical elements then recombines the elements into blocks of logic which can be implemented by the logic blocks 14 on the conceptual FPGA 10. The second step is placement which assigns the mapped logic blocks 14 to specific cell locations on the conceptual FPGA 10. The third step is routing which chooses the interconnect points that must be enabled so that the cells containing logic blocks 14 may be connected to one another by means of interconnection resources 16. Ultimately, the cell and interconnect programming is encoded in a bit stream which is downloaded to the conceptual FPGA 10, turning "on", or "off" the appropriate interconnect switches, whereupon the device is ready to be operated as a physical implementation of the specified circuit.

Figure 2C:
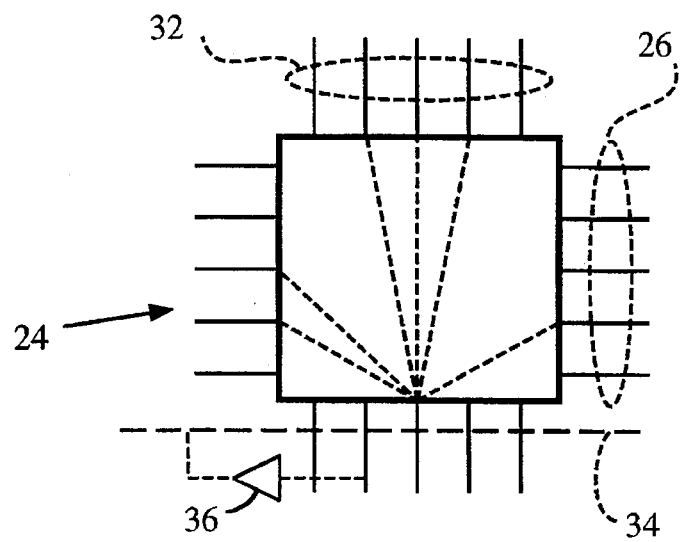
FIG. 2c is a simplified representation of a switch matrix of the FPGA of FIG. 2a illustrating a programmed function thereof and a tri-state buffer ("TBUF") for driving a global line.
Figure 2A:
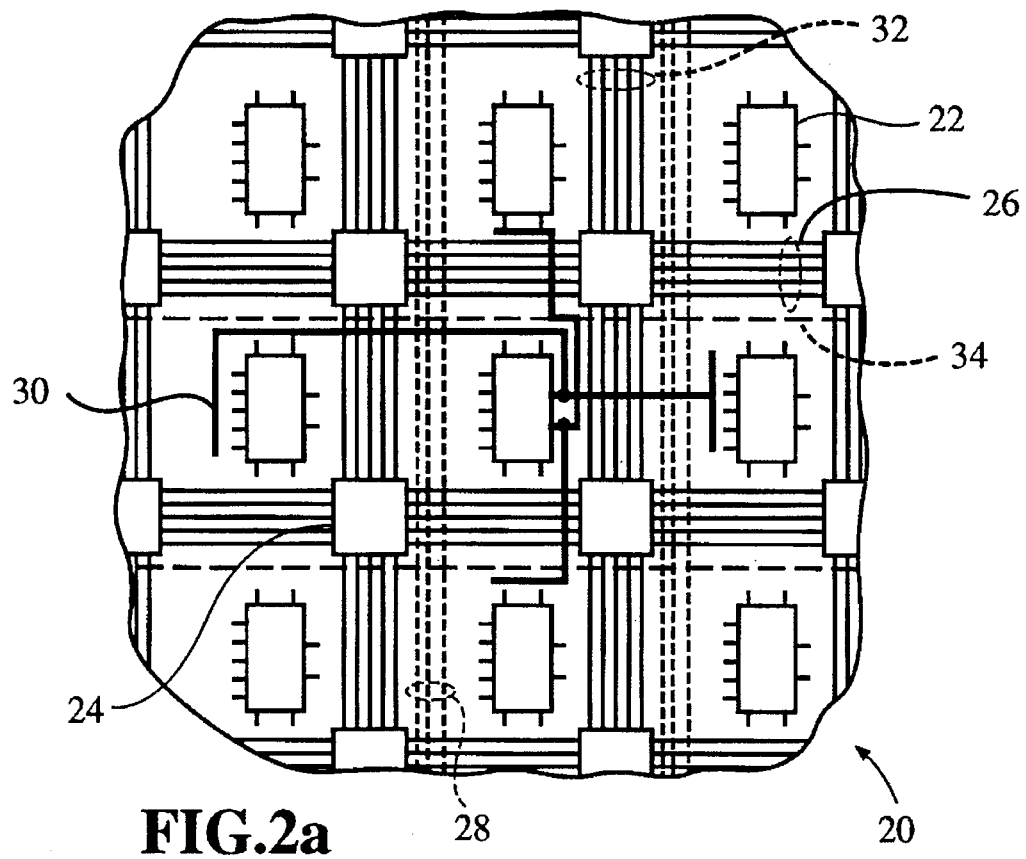
FIG. 2a is a simplified illustration of a portion of an FPGA device, as an example of one type of FPGA only, illustrating a number of logic blocks and switch matrices and the variety of programmable interconnects typically provided therein.

Referring now to FIG. 2a, a portion of an FPGA 20 is shown. FPGA 20 which, as a representative example only, depicts a Xilinx XC3000 device, comprises, in pertinent part, a number of logic blocks 22 and switch matrices 24. Switch matrices 24 may also be commonly referred to as switch boxes.

FPGA 20 further includes various types of interconnection resources for programmably interconnecting the logic blocks 22, such as general purposes interconnects 26 which horizontally interconnect switch matrices 24. A number of general purpose interconnects 32 vertically interconnect switch matrices 24. General purpose interconnects 26, 32 are also commonly referred to as local lines.

FPGA further includes other interconnection resources for programmably interconnecting logic blocks 22. A number of global lines 28 extend vertically through FPGA 20 while a similar global line 34 extends horizontally. Global lines 28, 34 are also commonly referred to as long lines. In addition, FPGA 20 may comprise a number of direct interconnects 30 for connecting logic blocks 22 other than through general purpose interconnects 26, 32 or global lines 28, 34.

Figure 2B:
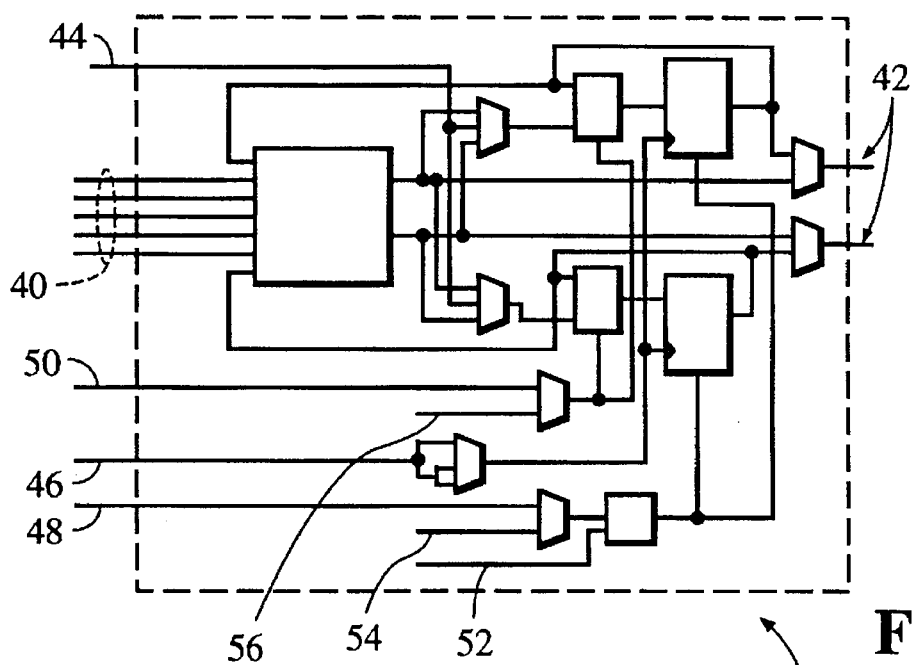
FIG. 2b is a representative illustration of a logic block of the FPGA of FIG. 2a showing the various available signal inputs and outputs thereof.

Referring additionally now to FIG. 2b, a logic block 22 of FPGA 20 of FIG. 2a is shown. Logic block 22 comprises a number of signal inputs and signal outputs which determine its functionality in the particular design to which it is mapped. In general, logic block 22 may include a plurality of inputs 40 (designated A–E), and outputs 42 (designated X–Y) depending on the programming thereof. Logic block 22 further includes a data input 44, clock input 46, reset input 48, and clock enable input 50. Logic block 22 may also include a global reset 52, circuit ground 54 and power input 56.

Referring additionally now to FIG. 2c, a switch matrix 24 as illustrated in FIG. 2a is shown. Switch matrix 24 is programmably switchable to interconnect any one or more of general purpose interconnects 26, 32 to others of general purpose interconnects 26, 32 as may be required in the programming of FPGA 20. Tri-state buffer ("TBUF") 36 connected to one of general purpose interconnects 32 is used to drive a global line 34 as shown.

FPGA 20 utilizes clock signals which have voltages which rise and fall regularly. The frequency of the clock signals is a measure of how fast FPGA 20 will operate. FPGA 20 will typically operate more slowly than other devices in the system into which it is incorporated and it tends to represent the lower bound of system operating frequency. It is, therefore, usually desirable to have FPGA 20 operate as fast as possible in a given specific circuit implementation. As has been previously described, FPGA 20 comprises a number of cells containing logic blocks 22 which can be programmed to perform a variety of logical functions, and a number of interconnection resources which can be programmed to connect the cells in a general way. The cells and interconnection resources are used to implement complex logical circuits.

Figure 8:
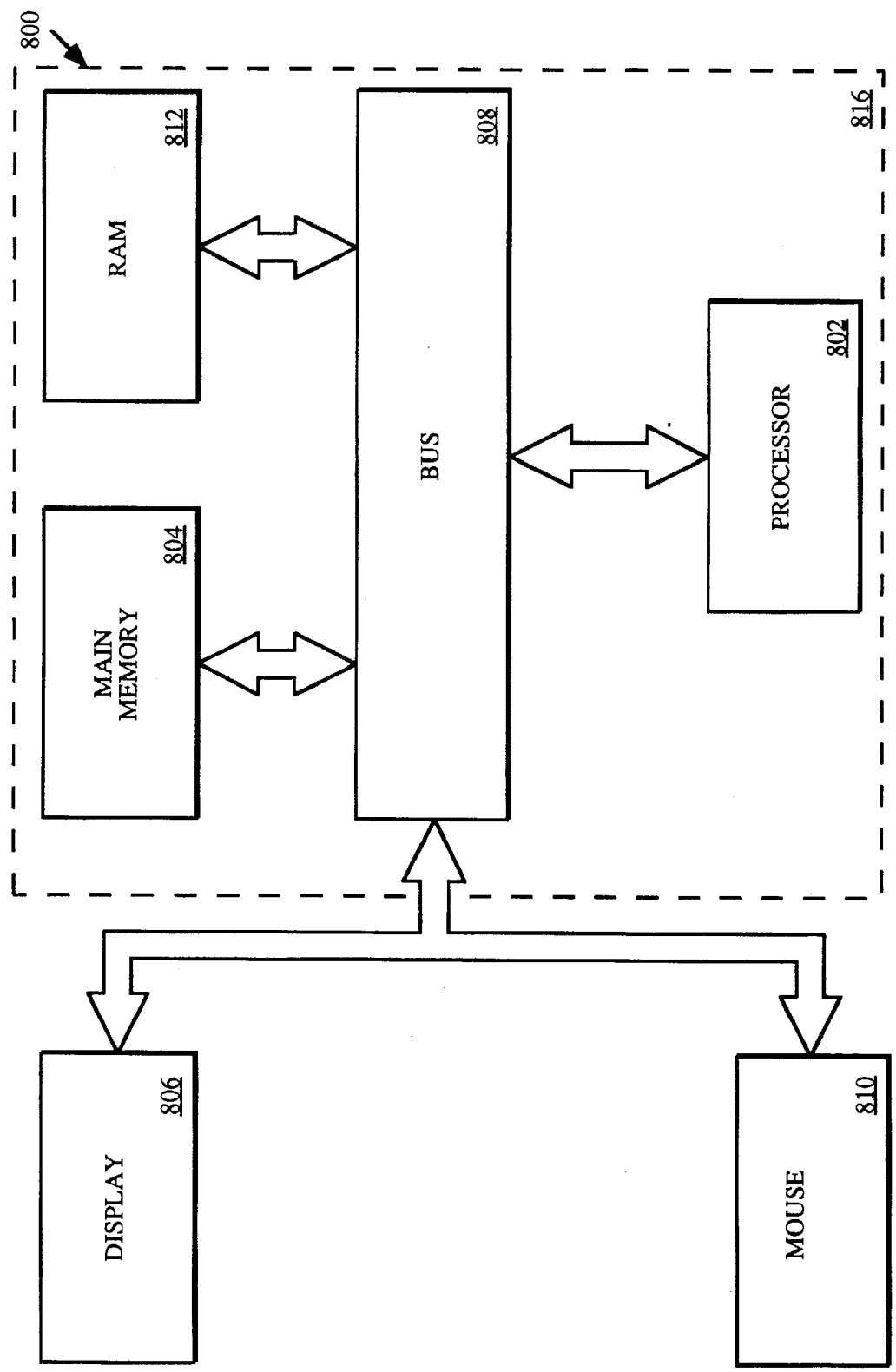
FIG. 8 is a block diagram of an embodiment of a computer system of the present invention.

The system and method of the present invention is implemented in a single executable computer timing module designed to be fully integrated with the NeoCAD™ FPGA Foundry™ device-independent modular toolset for FPGA design available from NeoCAD, Inc., 2585 Central Avenue, Boulder, Colo. 80301, assignee of the present invention. The Foundry operating environment, as with that of the timing module embodying the system and method of the present invention, includes a number of industry-standard digital computer platforms. Representative of the possible hardware operating environments are personal computer ("PC") based systems and workstations. Suggested hardware platforms include either a) an IBM-PC® or compatible 386/486SX (with coprocessor) or 486; MS DOS® 4.1 or higher; Microsoft® Windows 3.0 or higher in enhanced mode; a minimum of 16 MB of random access memory ("RAM"); 40 MB of disk space for the first family of FPGA's supported and 20 MB for each additional family; Swap: 10 MB permanent Microsoft Windows swap file; Color VGA monitor; ⅔ button Microsoft Windows compatible mouse; and one parallel port for transport security device or b) a Sun® SPARCstation® or compatible; SunOS® 4.1.1 or higher; X Windows® version X11R4 or higher and OSF® Motif 1.1; a minimum of 32 MB or RAM; 45 MB of disk space for the first family of FPGA's supported and 20 MB for each additional family; Swap space of 32 MB; color monitor; 3 button mouse and one serial port for a security device. FIG. 8 shows a typical hardware operating environment 800. Computer 816 includes a processor 802, main memory 804, RAM 812 and bus 808 for communicating between processor 802, main memory 804, RAM 812 and various computer peripherals. Typical computer peripherals 806 and 810 include display device 806, which can be for example, a color monitor. Mouse device 810 provides a way for the user to enter commands and data to computer 816. Additionally, the timing module embodying the system and method of the present invention may be utilized in conjunction with the Prism™ device independent logic-partitioning system for FPGA design, EPIC™ editor for programmable IC's and TRACE™ FPGA specific timing analyzer also available from NeoCAD, Inc.

The module hereinafter described is backed by an interface library of timing functions which can be used by placement and routing programs to generate a timing database of absolute timing constraints on both system and user specified paths in a design, and to check adherence of these constraints, insuring that the design meets the timing constraints.

As utilized herein:

"Timing Preference" is a user-defined timing limit on a design. Timing preferences define the constraints for timing verification and analysis. A timing preference can generate one or more timing constraints on the design.

"Timing Constraint" is an absolute time limit derived from a timing preference, limiting delay or skew on a circuit path or signal.

"Timing Verification" is the process of verification of design adherence to timing constraints.

"Delay Predictor" estimates wire delays for unrouted connections.

"Delay Calculator" calculates wire delays for routed connections.

Figure 2D:
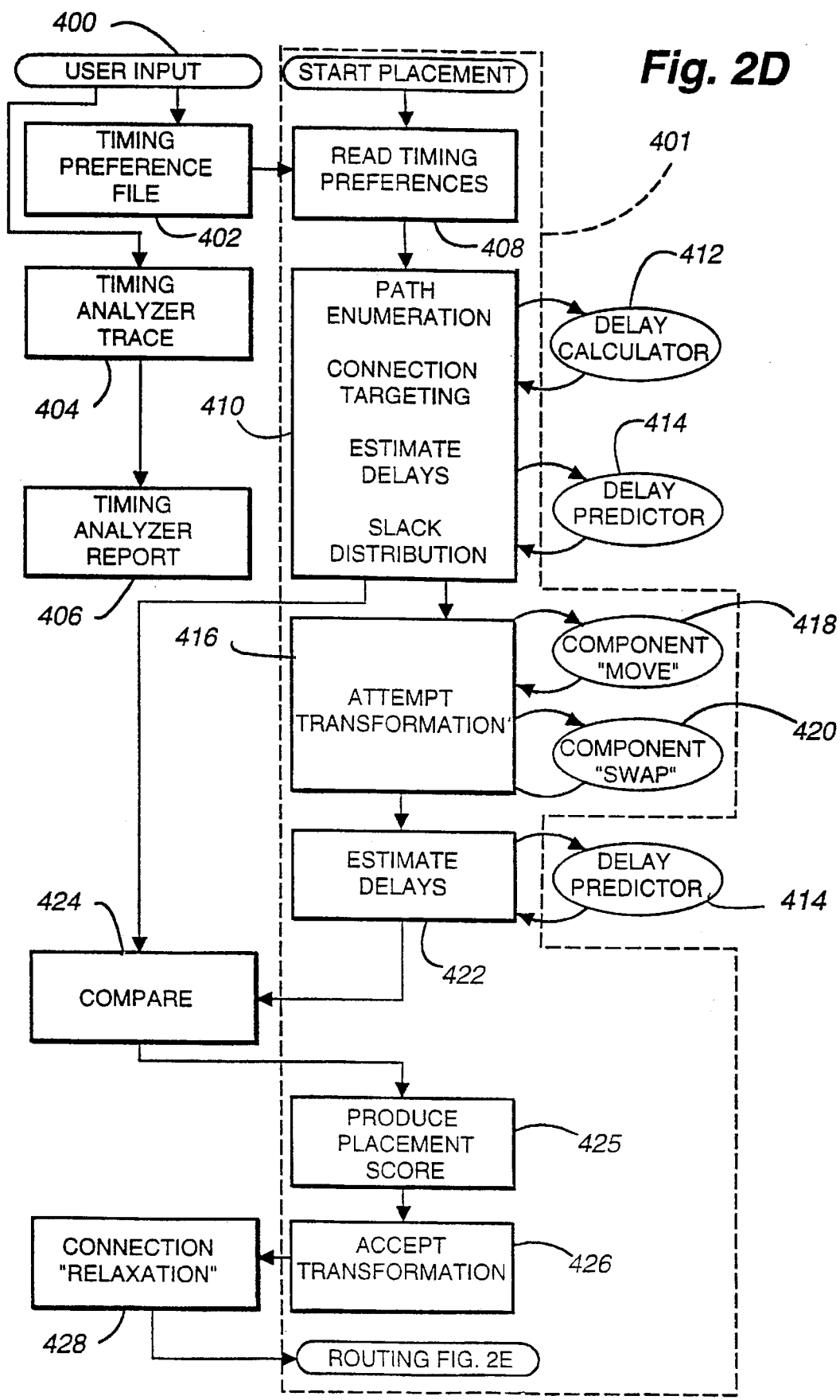
FIG. 2d is a functional block diagram of the overall system or method of the invention.

The process can be further described from the internal perspective, or its actual mechanics, as well as from the user perspective. In FIG. 2d the user 400 simply provides a frequency "preference" in a "preference file 402," and tells the place and route application ("PAR") 401 where to find the preference file. PAR then places and routes the design, and indicates whether all signals were completely routed, and if the timing preferences were met. If any preferences were not met, the user can run the timing analyzer, TRACE 404, which will report 406 paths that exceed the maximum delay. Remedial actions include modifying (relaxing) the preferences, running PAR with a different cost function, and manual intervention.

Internally, PAR 401 reads 408 the timing preferences, then passes them on to the timing module 410 which performs "path enumeration" for the design. This process builds connectivity graphs. Then, the timing module 410 does "connection targeting (FIGS. 5a and 5B"), which assigns to each connection the maximum route delay which will not cause any maximum path delay specification to be exceeded. During this process, the module 410 uses either actual delays from existing routing (via the delay calculator 412) or estimated delays (via the Delay Predictor 414 (FIGS. 4a–4c)) to determine whether each path has positive or negative "slack." Positive slack means that the path as routed (or estimated) has a total delay below the specified (or computed) maximum. Negative slack means that the path delay exceeds the maximum. Slack, whether positive or negative, is distributed among the connections which make up the path. If the slack is positive, this allows the placer or router to increase that connection's delay by the amount of the slack without causing an error. Such an increase may be necessary when reducing the delay of another connection. If the slack is negative, then the placer or router must try to reduce the delays in that path further.

During the placement process 416, when a transformation (component move 418 or swap 420) is attempted, all of the connections relevant to the transformation (i.e. connected to the moving components(s)) must have their delays estimated 422. The new estimates are compared 424 with the connections' delay targets to produce a score 425, which is used to decide 426 whether or not to accept the transformation.

Periodically, the placer will ask the timing module to perform "connection relaxation," 428 which redistributes the slack among connections. The algorithm takes into account the fact that some connections belong to multiple paths, and attempts to maximize the positive slack (or minimize negative slack) for each connection.

Figure 2E:
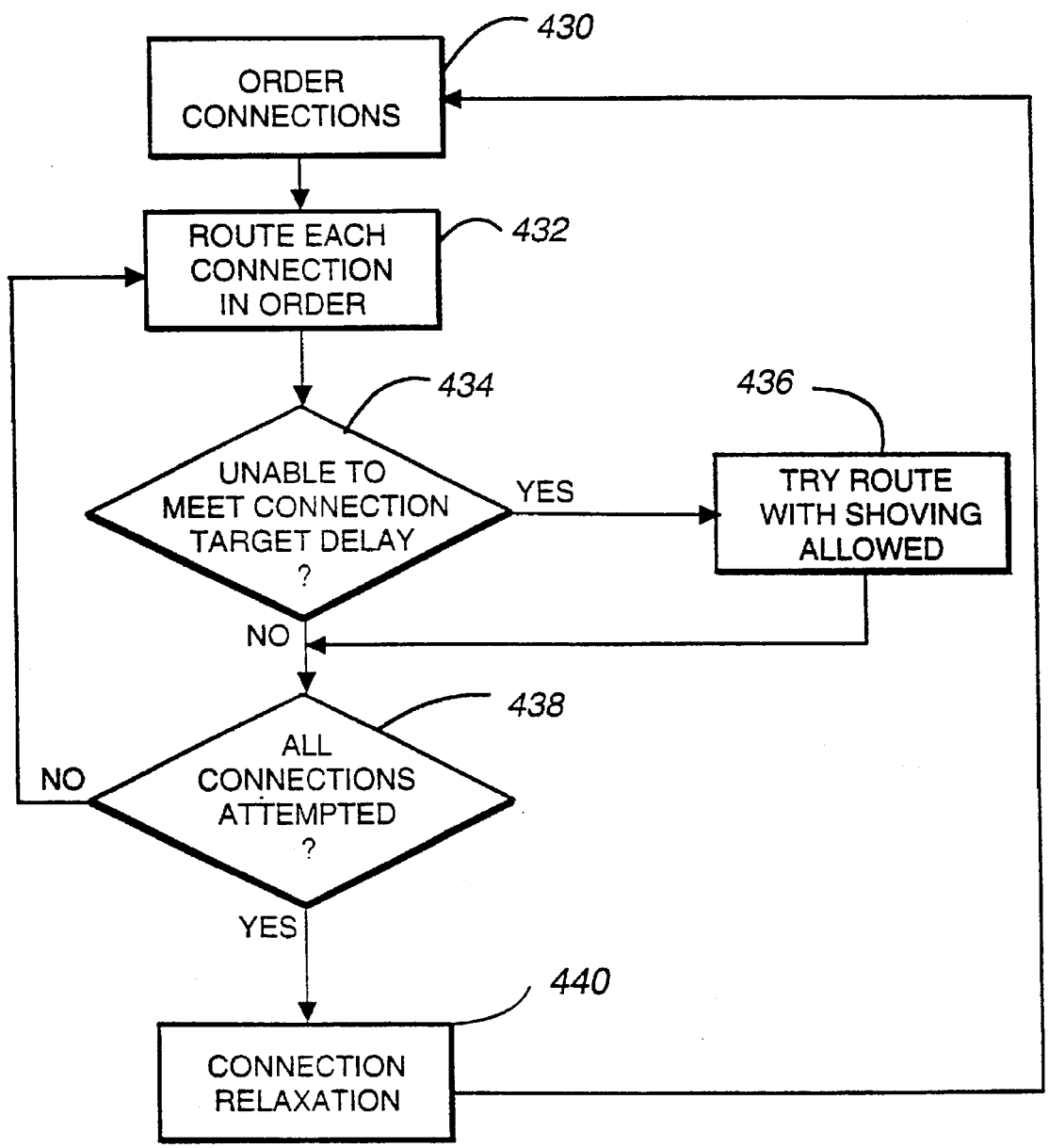
FIG. 2e is a functional block diagram of the routing system or method referred to in FIG. 2d.

After placement is complete, the router shown in FIG. 2e takes over. First, the connections to be routed are ordered 430, with particular attention to constrained connections. Then the router routes 432 each connection in order. If it is unable 434 to meet the target delay for a connection, the router will try 436 again, allowing the connection to shove other routing out of the way. After all connections have been attempted 438, the timing module performs "relaxation," 440 then the router reorders the connections and retries them. This continues until all connections are routed, and all target delays are achieved, or the router gives up.

The input to the software module is a mapped NeoCAD design database as will be more fully described hereinafter. Optional input includes an ASCII preference file containing user timing preferences, which define generalized or absolute timing limits on design delays.

Timing Preferences

Timing preferences will define the constraints used to perform timing verification. Preferences can apply to design paths or signals, and could indicate a clock frequency or period, the external timing relationship between two or more input signals, an absolute maximum delay requirement on a design path, an absolute maximum delay or skew limit on a design net, or a global timing requirement for a class of design pins.

The NeoCAD Preference Language (NPL) defines the actual language syntax for timing preferences. The following BNF language definition describes the timing preferences supported in the language:

value (in Hertz). Note that the NeoCAD preference language supports nanoseconds, milliseconds, and microseconds for time units, megahertz and kilohertz for frequency units.

The ASCII symbol <name> is context sensitive. If <name> is associated with a PATH terminal symbol, it must refer to a <path> specification. The <path> specification represents a delay path in the design. It can be specified with an optional component name indicating the start of the path (to designate a single driver in multiple driver situations), any number of net name designators, and an optional component name indicating the end of the path (to designate a single load in multiple fanout situations).

If <name> is associated with a BUS terminal symbol, it must refer to a <bus> specification. If <name> is associated with a NET terminal symbol, it must be the name of a valid signal net in the design. If <name> is associated with a COMP terminal symbol, it must be the name of a valid component name in the design. The names can refer to either the logical (schematic) or physical (FPGA) signals and components.

Path Classes

Figure 3A:
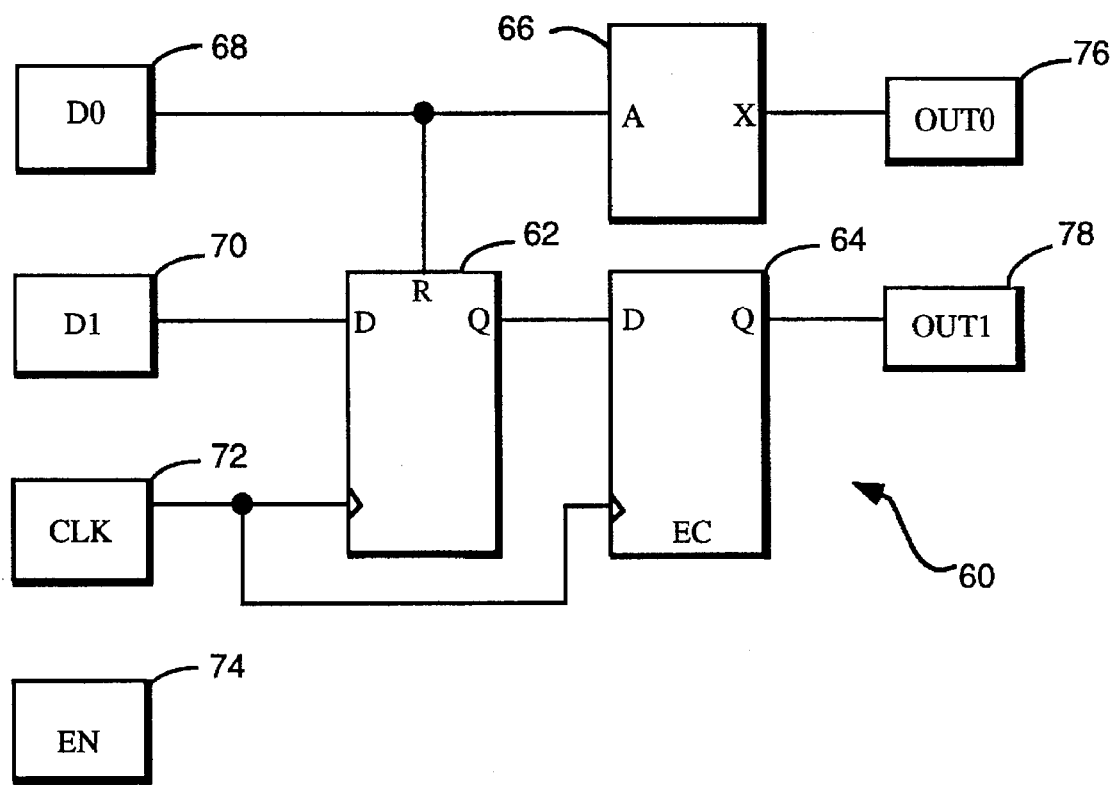
FIG. 3a is a functional logic block diagram illustrative of the path classes supported by the system and method of the present invention.

There are six general path classes that can be used with the MAXDELAY and BLOCK preferences to check maximum delay or block checking on an entire class of design paths. FIG. 3a illustrates the path classes supported by the system and method of the present invention by use of an exemplary circuit 60:

The path class ASYNCPATHS is used to specify all asynchronous reset paths in the design, terminating at an asynchronous reset pin on a design component. In FIG. 3a, the path from component D0 68 to the component CLB1 62 pin R (D0 68 ->CBL1.R 62) is an asynchronous reset path.

The class SYNCPATHS is used to specify all synchronous data paths in the design, terminating at a synchronous data input pin on a design component. A synchronous data input pin is defined a data input to a design component that has a setup and/or hold requirement relative to a clock input pin on the component. In FIG. 3a, the paths (D1 70 ->CLB1.D 62) AND (CLB1.Q 62 ->CLB2.D 64) are synchronous paths.

The path class CLOCKPATHS is used to define all paths terminating at a clock input of a design component. In FIG. 3a the paths (CLK 72 ->CLB1 62) AND (CLK 72 ->CLB2 64) are clock paths. ENABLEPATHS is used to define all paths terminating at a clock enable input of a design component. The path (EN 74 ->CLB2.EC 64) is an enable path.

Finally, OUTPUTPATHS is used to define all paths that terminate at a primary output ("IOB") component in the

```
<pref>          ::= <period> | <frequency> |
                    <maxdelay> | <maxskew> | <block> |
                    <offset> ;
<period>        ::= PERIOD (NET <name>] <ns>
<frequency>     ::= FREQUENCY [NET <name>] <Hz>
<maxdelay>      ::= MAXDELAY
<pathclass>|allnets|( (NET|BUS|PATH) <name>) <ns>
<maxskew>       ::= MAXSKEW [(NET|BUS) <name>] <ns>
<block>         ::= BLOCK <class>| ((NET|BUS|PATH)
                    <name>)
<offset>        ::= OFFSET (IN|OUT) COMP <name> <ns>
(BEFORE|AFTER) COMP <name>
<pathclass>     ::=
allpaths|asyncpaths|syncpaths|clockpaths|enablepaths|
outputpaths
<path>          ::= { (COMP <name>] NET <name>} [COMP
                    <name>]
<bus>           ::= {NET <name>}
``` where the terminal symbol <ns> represents a floating point value (in nanoseconds), and <Hz> represents a floating point design. In the example above, the paths (D0 68 ->CLB0.A 66 ->CLB0.X 66 ->OUT0 76) and (CLB2.Q 64 ->OUT1 78)

are output paths. OUTPUTPATHS do not proceed through sequential elements.

The superclass ALLPATHS is a union of the path classes listed above.

Timing Constraints

The ASCII user preference file specified for a particular design is used to generate the timing constraints for verification by the timing module. Each timing preference can generate many timing constraints in the design. For instance, a PERIOD or FREQUENCY preference will generate a timing constraint for every data path clocked by the specified net, and a MAXDELAY <pathclass> will generate a timing constraint on every path in the specified path class.

Note: if no timing preferences are specified in the user preference file, no timing constraints will be generated for the design.

PERIOD and FREQUENCY Preferences

The PERIOD and FREQUENCY preferences are used to specify a clock period for all sequential input pins clocked by the specified net. If no net name is specified, the preference applies to all sequential input pins that do not have a specific PERIOD or FREQUENCY preference.

All paths terminating at sequential input pins clocked by the specified net are enumerated (see Path Enumeration), and the specified clock period/frequency is used as the maximum delay limit to create a PATHDELAY constraint. Paths to clock pins of the specified net are also enumerated (for timing analysis), but they are not assigned a constraint.

MAXDELAY Preference

The MAXDELAY preference is used to specify a maximum delay value for a circuit path or net in the design. If a <path> is specified, the delay value is applied as the PATHDELAY constraint for the circuit path(s).

If the keyword ALLPATHS is specified, the delay value is applied as the constraint for all paths in the design that do not have a specific MAXDELAY, PERIOD, or FREQUENCY preference. Similarly, the keywords ASYNCPATHS, SYNCPATHS, CLOCKPATHS, ENABLEPATHS, and OUTPUTPATHS enumerate paths of the specified class and apply the maximum delay value as the PATHDELAY constraint for each of the paths that does not have a specific MAXDELAY, PERIOD, or FREQUENCY preference.

If a <net> is specified, the delay value is used as the maximum delay limit to create a NETDELAY constraint for all driver-to-load connections on the net. If the keyword ALLNETS is specified, the delay value is applied as the NETDELAY constraint for all nets in the design that do not have a specific MAXDELAY preference. If a <bus> is specified, the delay value is applied as the NETDELAY constraint for all driver-to-load connections on the nets that belong to the specified bus.

MAXSKEW Preference

The MAXSKEW preference is used to specify the signal skew between a driver and loads on a given signal. A NETSKEW constraint is created with the specified maximum skew value. If no signal is specified, the preference applies to all clock signals (signals with a clock pin as a load) that do not have a specific MAXSKEW preference.

OFFSET Preference

The OFFSET preference is used to specify the external timing relationship between a clock input and a data input/output of the FPGA that have a common sequential element within the FPGA. If a data input is specified, an OFFSET/IN constraint is generated to ensure adherence to internal setup requirements for all sequential elements within the FPGA for the data path relative to the specified clock input. If a data output is specified, a OFFSET/OUT constraint is generated to ensure the path delay from the clock input to the data output through common sequential elements do not exceed the specified external timing requirement.

Figure 3B:
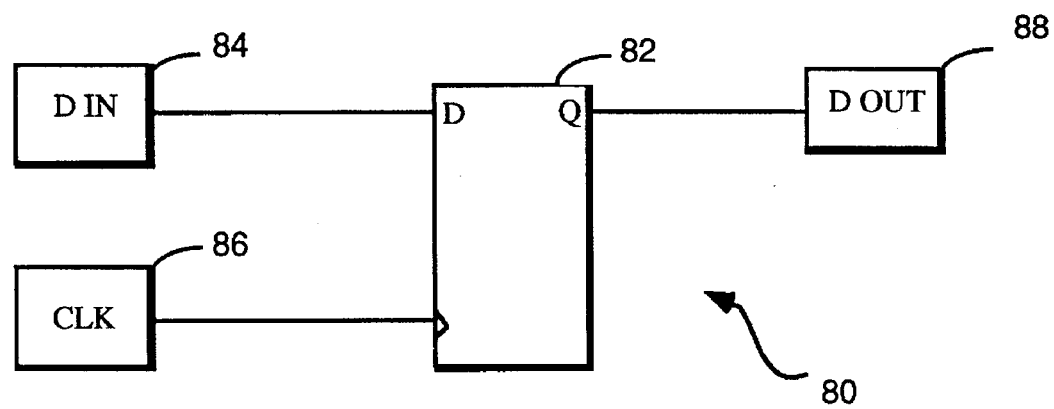
FIG. 3b is a functional logic block diagram illustrative of the relationship between a clocked input path and a clocked output path.

With reference now to FIG. 3b, an exemplary circuit 80 is shown in which the path (DIN 84 -> CLB1.D 82) is a clocked input path, and the path (CLB1.Q 82 -> DOUT 88) is a clocked output path.

OFFSET IN/BEFORE

The "OFFSET IN ... BEFORE" preference specifies that a data input arrives before the specified clock input. The setup offset is equal to the specified offset value. For instance, if the preference associated with the above example was "OFFSET IN DIN 5ns BEFORE CLK", the minimum path delay from (CLK 86 ->CLB1 82) must be greater than the path delay from (DIN 84 ->CLB1.D 82) plus the appropriate setup time, less the specified offset value (since DIN 84 arrives BEFORE CLK 86). An error would occur if:

MIN(CLK 86->CLB 182)<=MAX(DIN 84->CLB1.D 82)+setup−offset

OFFSET IN/AFTER

The "OFFSET IN ... AFTER" preference specifies that a data input arrives after the specified clock input (before the next clock edge). The setup offset is equal to the period for the clock path less the specified offset. For instance, if the preference associated with the above example was "OFFSET IN DIN 5 ns AFTER CLK", the minimum path delay from (CLK 86 -> CLB1 82) must be greater than the path delay from (DIN 84 -> CLB1.D 82) plus the appropriate setup time, less the difference between the clock period and the specified offset MIN(CLK 86 -> CLB1 82) <=MAX (DIN 84 -> CLB1.D 82)+setup−(period−offset)

OFFSET OUT/AFTER

The "OFFSET OUT ... AFTER" preference specifies that a data output arrives at the specified offset after the clock input. For instance, if the preference associated with the above example was "OFFSET OUT DOUT 5 ns AFTER CLK", the specified offset value must be less than the sum of the maximum path delay from (CLK 86 -> CLB1 82) and the maximum path delay from (CLB1.Q 82 -> DOUT 88) (since DOUT 88 arrives AFTER CLK 86). An error would occur if:

offset>=MAX(CLK 86 ->CLB1 82)+MAX(CLB1.Q 82 ->DOUT88)

OFFSET OUT/BEFORE

The "OFFSET OUT ... BEFORE" preference specifies that a data output arrives before the next clock input. For instance, if the preference associated with the above example was "OFFSET OUT DOUT 5 ns BEFORE CLK", the clock period less the specified offset value must be less than the sum of the maximum path delay from (CLK 86 -> CLB1 82) and the maximum path delay from (CLB1.Q 82 -> DOUT 88) (since DOUT 88 arrives BEFORE next CLK 86). An error would occur if:

(period−offset)>=MAX(CLK 86 ->CLB1 82)+MAX(CLB1.Q 82 ->DOUT 88)

BLOCK Preference

The BLOCK preference is used to block timing checks on irrelevant paths in a design. If a full <path> is specified, the path is blocked from consideration by the timing calculator and verifier. If a <net> is specified, all paths through the specified net are blocked.

If any of the path classes ASYNCPATHS, SYNCPATHS, CLOCKPATHS, ENABLEPATHS, or OUTPUTPATHS are specified, all paths of the specified class are blocked from timing analysis and verification.

Path Specification

The path specification is used to specify a particular delay path in the design. A typical path specification will contain a list of net names that uniquely identify a delay path in the design. However, the user may specify component names in the path to clarify ambiguous paths. All component and net delays between the first and last nets in the path are included in the path. If multiple drivers or loads exist at the end of a path specification, the path specification is expanded to include all possible paths between the multiple endpoints. Component names can be included at the endpoint of a path to reduce path expansion.

If an endpoint component of a user-defined path is a primary input or primary output, the pin-to-pad delay of the component is included in the path. Paths that originate at sequential output pins automatically have the clk-to-q component delay (if any) included in the path. Paths that terminate at sequential input pins automatically have the setup and hold requirements accounted for in any timing constraint analysis and verification.

Conflict Resolution

Conflicting preferences are resolved by hierarchical precedence, with global preferences being the weakest, followed by group preferences (i.e. BUS preferences), and finally individual preferences (i.e. NET or PATH preferences). Conflicting preferences of the same type are resolved with the more restrictive preference taking precedence.

Path Enumeration

A depth-first path enumeration technique [Hitchcock, R., "Timing Verification and the Timing Analysis Program," Proceedings 19th Design Automation Conference, 1982, pp.; Roth J. P., "Diagnosis of Automata Failures: A Calculus and a Methods," IBM Journal of Research and Development, July 1966, pp. 278–291] is used to fully enumerate all possible input paths to a design component pin. This is necessary to ensure that the routes of all paths meet the timing requirements.

Path enumeration starts at each pin, following component logic and fanin topology through successive fanin levels, until a primary input pin or clock input pin is found.

False Paths

False path detection involves the identification and elimination of unsensitized paths from the timing database. This is desirable, as elimination of false paths from the timing database would reduce the number of timing constraints on the NeoCAD partition, place and route tools.

Current research [Du, D., Yen, S., and Ghanta, S., "On the General False Path Problem in Timing Analysis," Proceedings 26th Design Automation Conference, 1989, pp. 555–560; Liu, L., Chen, H., and Du, D., "The Calculation of Signal Stable Ranges Combinational Circuits," Proceedings ICCAD-91, 1991, pp. 312–315; McGeer, P., and Brayton, R., "Efficient Algorithms for Computing the Longest Viable Path in a Combinational Network," Proceedings 26th Design Automation Conference, 1989, pp. 561–567; Perremans, S., Classen, L., and De Man, H., "Static Timing Analysis of Dynamically Sensitizable Paths," Proceedings 26th Design Automation Conference, 1989, pp. 568–573; Stewart, R. and Benkoski, J., "Static Timing Analysis using Interval Constraints," Proceedings ICCAD-91, 1991, pp. 308–311] indicates that reliable false path detection depends on fixed and accurate circuit delay information. In the NeoCAD place and route environment (where routing operations routinely modify the circuit's delay characteristics), circuit delay information is hardly constant.

This could lead to inaccurate identification of false paths, leaving some valid paths unconstrained, and some invalid paths unnecessarily constrained. Furthermore, each routing pass could modify the accuracy of all previous false path identifications. Therefore false path detection and elimination will not be performed in the timing module.

Path Delay Calculation

Path delay calculation includes the component and wire delay along the path. It may also account for a setup time on constrained sequential input pins.

Component Delay

Component delay is the pin-to-pin delay values for the delay through the component. Both rise and fall delays are used to accurately calculate the path delay, when supplied by the FPGA vendor. Component logic sense, if available, is used to track both rising and falling edges through a path.

Only maximum delays are calculated for the component delay along a path. Minimum delay values are not calculated and verified due to a lack of vendor information on minimum component delays [Xilinx, Inc., "Programmable Gate Array Data Book," Xilinx, Inc., San Jose, Calif., 1989, page 6–18], and because vendors will often bin faster parts in a slower speed grade (making guaranteed minimum timing problematic).

I/O Delays

Additional delay is added to a path's component delay for device input and output delays (pin-to-pad delays).

Wire Delay

Wire delay is calculated using the Timing Estimator for unrouted connections and the Timing Calculator for routed connections.

Setup/Hold Requirements

For paths terminating at sequential input pins, the setup and hold requirements (relative to a clocking input pin) are accounted for in all timing analysis and verification of the path relative to a specified timing constraint.

Net Delay Calculation

Net delay is calculated using the Timing Estimator for unrouted net connections and the Timing Calculator for routed net connections.

Delay Predictor

Unrouted connection delay is estimated by the delay predictor. The estimate is device specific, and is affected by the likelihood that fast routing resources will be available for the connection. The delay predictor will be more fully described hereinafter with reference to FIGS. 4a–4c.

Delay Calculator

Routed connection delay is calculated using a standard RC delay calculation [Rubenstein, J., Penfield, P., and Horowitz, M., "Signal Delay in RC Tree Networks," IEEE Transactions on Computer-Aided Design, Vol CAD-2, No. 3, July 1983, pp. 202–211].

Timing Verification

The timing module allows client applications to perform timing verification of an FPGA design, given the design and a preference file containing timing preferences. Once a timing database has been generated for a particular design, client applications can dynamically verify design compliance with the timing constraints. Timing verification checks the actual net and path delays of the design against the specified timing constraints, and determines compliance with the timing constraints.

NETDELAY Constraints

Signal delay is checked against the specified maximum delay for a driver-to-load connection on constrained signals. The following inequality is used to determine if the signal delay exceeds the specified constraint:

constraint>=MAX(conndelay)

where constraint is the maximum delay constraint, and MAX(conndelay) is the maximum driver-to-load delay for all connections on the net.

NETSKEW Constraints

Signal skew is checked against the specified maximum skew for constrained signals. The following inequality is used to determine if the signal skew exceeds the specified skew constraint:

constraint>=maxconndelay−minconndelay where constraint is the maximum skew constraint, minconndelay is the minimum connection delay between a driver and all loads on the signal, and maxconndelay is the maximum connection delay between a driver and all loads on the signal. If the signal skew exceeds the specified constraint, a skew error will be output to the timing report.

PATHDELAY Constraints

For a PATHDELAY constraint, each path is checked with the following inequality:

constraint>=compdelay+conndelay+setuptime where compdelay represents the summation of component delay along the path, conndelay is the summation of connection delay along the path, and setuptime is the setup requirement (if any) for paths terminating at sequential input pins. Those paths with component and connection delays that exceed the constraint will be flagged as timing errors in the timing report.

OFFSET/IN Constraints

For paths with OFFSET/IN constraints relative to a clock input path the inequality minclkdelay>=maxdatadelay+setuptime−offset is used to check a primary input with an external arrival time BEFORE a clock input, and minclkdelay=<maxdatadelay+setuptime−(period−offset)

is used to check a primary input with an external arrival time AFTER a clock input. OFFSET/IN errors are also listed in the timing report.

Note that a clock period or frequency preference is required for OFFSET IN/AFTER preference.

OFFSET/OUT Constraints

For paths with OFFSET/OUT constraints relative to a clock input path, the inequality offset>=maxclkdelay+maxdatadelay is used to check the path delay to the primary output AFTER the clock input, and (period−offset)>=maxclkdelay+maxdatadelay is used to check the path delay to the primary output BEFORE the next clock input. OFFSET/OUT errors are also listed in the timing report.

Note that a clock period or frequency preference is required for OFFSET OUT/BEFORE preference.

Connection Delay Targets

In order to reduce the amount of data necessary to verify design timing, the system and method of the present invention generates a database of connection target delays, which can be efficiently verified by client applications. This reduces the amount of work needed to verify timing constraints significantly.

Target Assignment

Target delay assignment for design connections restricted by timing preferences is automatic with generation of the timing database. These targets are used to perform timing-driven partition, place and route.

Connection delay targets for design connections restricted by timing constraints are established with the minimum/maximum possible connection delay values that will satisfy all net and path timing constraints that contain the connection [Bening, L. C. and Lane, T. A., "Developments in Logic Network Path Delay Analysis" Proceedings 19th Design Automation Conference, 1982, pp. 605–615; Jackson, M. A. B and Kuh, E. S., "Performance-Driven Placement of Cell Based IC's" Proceedings 26th Design Automation Conference, 1989, pp. 370–375; Youssef, H, and Shragowitz, E., "Timing Constraints for Correct Performance," Proceedings ICCAD-90, 1990, pp. 24–27]. For instance, the slack (available delay) along a path is:

slack=(constraint−setuptime)−(sumcompdelay+sumconndelay)

where sumconndelay is the summation of connection delays for the path, sumcompdelay is the summation of component delays for a path, and the setuptime is the setup time (if any) for paths terminating at sequential input pins. If positive slack exists for the path, it can be equitably divided among the connections in the path. If negative slack exists for the path, each connection can equitably be reduced. In general, the target delay value for a connection (relative to a specific path constraint) is:

conn.target=conn.delay+((conn.delay/sumconndelay)*slack)

where conn.delay is the estimated or actual delay for the connection, and sumconndelay is the summation of connection delays for the path, and conn.target is the connection's maximum delay target relative to the path. Minimum delay targets can also be established for connections covered by a NETSKEW or OFFSET/IN constraint.

Note that each connection's target delay must be set relative to all net and path constraints on the connection. For instance, if a NETDELAY constraint imposes a lesser delay on a connection than all of it's path constraints, the lesser value will take precedence. In this way adherence to the connection target delays ensures that all timing constraints will be met [Youssef, H, and Shragowitz, E., "Timing Constraints for Correct Performance," Proceedings ICCAD-90, 1990, pp. 24–27].

With reference now to FIGS. 5a and 5b, the process flow for the computation of connection targets in the system and method of the present invention is shown. At step 150 the variable C is assigned the value of 0 and passed to connector 152 for transfer to operation 154 where conns[c].mintarget is assigned the value of 0 and conns[c].maxtarget is assigned the value ∞.

Following operation 154, at decision 156, C is tested to see if it is less than design.numconns and, if true, the variable C is assigned the value of C+1 at operation 158 and applied to connector 152. If C is not less than design.numconns, the result process continues to step 160 where the variable P is assigned the value of 0.

Following step 160, the process continues to connector 162 and operation 164 where minslack is assigned paths[p].minslack and maxslack is assigned paths[p].maxslack and the process proceeds to step 166 where C and delay are both assigned a value of 0. Following connector 168, delay is assigned the value of delay + conns[c].delay at operation 170 and the result passed to decision 172 where, if C is determined to be less than paths.nummconns, C is assigned the value of C+1 at operation 174 and applied to connector 168. If C is not less than paths.numconns at decision 172, C is assigned the value of 0, mintarget is assigned the value of 0 and maxtarget is assigned the value of ∞ at step 176. Following connector 178, at decision 180, if delay equals 0, mintarget is assigned the value of minslack/path[p].numconns and maxtarget is assigned the value of maxslack/path[p].numconns at operation 182. Otherwise, if delay does not equal 0 at decision 180, mintarget is assigned the value of conns[c].delay − ((conns[c].delay/delay) * minslack) and maxtarget is assigned the value of conns[c].delay + ((conns[c].delay/delay) * maxslack). The results of operations 182 and 184 are applied to connector 186 for input to decision 188 where, if mintarget is greater than conns[c].mintarget, conns[c].mintarget is assigned the value of mintarget at operation 190. The results of operation 190 are applied to connector 192 along with a result of mintarget not being greater than conns[c].mintarget at decision 188 and, at decision 194, if maxtarget is less than conns[c].maxtarget, conns[c].maxtarget is assigned the value of maxtarget at operation 196. If maxtarget is not less than conns[c].maxtarget, the process proceeds with the results of operation 196 through connector 198 to decision 200. At decision 200, if C is less than paths.numconns, C is assigned the value of C+1 at operation 202 and the results passed to connector 178. If C is not less than paths.numconns at decision 200, at decision 204, if P is less than design.numpaths, P is assigned the value of P+1 at operation 206 and the results applied to connector 162. If P is not less than design.numpaths at decision 204, the process proceeds to the end step 208 and is completed.

The above described process may also be understood with respect to the following pseudocode representation.

---

Pseudocode: Compute Connection Targets

---

```
          for each conn in the design
conn.mintarget := 0
conn.maxtarget := maximum possible delay
end
for each path in the design
    minslack := path slack above minimum
    maxslack := path slack below maximum
    sumdelay := total conn delay in path
    for each conn in path
    mintarget := 0
    maxtarget := maximum possible delay
    if (sumdelay=0)
        // Divide slack equally for paths
        // that are totally unplaced
        mintarget := minslack /
                     path.numconns
        maxtarget := maxslack /
                     path.numconns
    else
        // Distribute slack pro rata
        mintarget := conn.delay −
                     (conn.delay/sumdelay)
                     * minslack
        maxtarget := conn.delay +
                     (conn.delay/sumdelay)
                     *maxslack
    // Check the new targets against
       existing targets
       for the conn
    if (mintarget > conn.mintarget)
       conn.mintarget := mintarget
    if (maxtarget < conn.maxtarget)
       conn.maxtarget := maxtarget
  end
end
```

Target Relaxation

If a connection appears in more than one path, its target delays will be the most restrictive of the targets computed by the formula listed above. As a consequence, other connections in the same path may have their target delays adjusted to compensate for the additional slack available. The process of reallocating this "unused" slack is called connection relaxation, and is described in [Youssef, H, and Shragowitz, E., "Timing Constraints for Correct Performance," Proceedings ICCAD-90, 1990, pp. 24–27].

With reference now to FIGS. 6a–6c, the process flow for the relaxation of connection targets in accordance with the system and method of the present invention is shown. The process flow begins at connector 220 and proceeds to step 222 where C is assigned the value of 0. Following step 222 and connector 224, conns[c].mindelta and conns[c].maxdelta are both assigned a value of ∞ at operation 226. If C is less than design.numconns at decision 228, C is assigned the value of C+1 at operation 230 and the results passed to connector 224. If C is not less than design.numconns at decision 228, P is assigned the value of 0 at step 232. The process continues through connector 234 to operation 236 where C, mintargets, maxtargets, and delays are each assigned the value of 0.

Following operation 236 and connector 238, mintargets is assigned the value of mintargets + paths[p].conns[c].mintarget; maxtargets is assigned the value of maxtargets= paths[p].conns[c].maxtarget; and delays is assigned the value of delays=paths[p].conns[c].delay at operation 240. At decision 242, if C is less than paths[p].numconns, C is assigned the value of C+1 at operation 244 and the result applied to connector 238. If C is not less than paths[p].numconns, the process proceeds to operation 246 where minslack is assigned the value of paths[p].minslack and maxslack is assigned the value of paths[p].maxslack. At operation 248, minslack is assigned the value of minslack−delays+mintargets and Maxslack is assigned the value of maxslack+delays maxtargets. Following operation 248, C is assigned the value of 0 at step 250 and the process proceeds through connector 252 to operation 254 where mindelta is assigned the value of minslack * (paths[p].conns[c].mintarget/mintargets) and maxdelta is assigned the value of maxslack * (paths[p].conns[c].maxtarget/maxtargets).

At decision 256, if mindelta is less than paths[p].conns[c].mindelta, paths[p].conns[c].mindelta is assigned the value of mindelta at operation 258. If mindelta is not less than paths[p].conns[c].mindelta at decision 256, the process continues through connector 260 with the results of operation 258 to decision 262 where, if maxdelta is less than paths[p].conns[c].maxdelta, paths[p].conns[c].maxdelta is assigned the value of maxdelta at operation 264. A false indication at decision 262 and the results of operation 264 are applied to connector 266 to decision 268 where, if C is less than paths[p].numconns, C is assigned the value of C+1 at operation 270 and the results applied to connector 252. If C is not less than paths[p].numconns at decision 268, the process proceeds to decision 272.

At decision 272, if P is less than design.numpaths, P is assigned the value of P+1 and the process returns to connector 234. If P is not less than design.numpaths, the process continues to step 276 where C is assigned the value of 0. Following connector 278, conns[c].mintarget is assigned the value of conns[c].mintarget−conns[c].mindelta and conns[c].maxtarget is assigned the value of conns[c].maxtarget +conns[c].maxdelta at operation 280. At decision 282, if C is less than design.numconns, C is assigned the value of C+1 at operation 284 and the process returns to connector 278. Otherwise, if C is not less than design.numconns at decision 282, the process proceeds to decision 286 where, if all conns.mindelta are equal to 0 and all conns.maxdelta are also equal to 0, the process is completed at step 288. Otherwise, the process returns to connector 220 and the relax connection targets process is repeated.

The above-described process may also be understood with respect to the following pseudocode representation.

---
Pseudocode: Relax Connection Targets
---

```
while not done
    // Initialize an array of connection delta
        values for all
    // design connections to the largest practical
        delay value.
    for each conn in design
        conn.mindelta := infinity
        conn.maxdelta := infinity
    for each design path
        // Get the summation of connection targets
            for the path
        mintargets :=    Σ conn[i].mintarget,
                         i=1,path.numconns
        maxtargets :=    Σ conn[i].maxtarget,
                         i=1,path.numconns
        // Get the summation of actual connection
            delays for the path
        delays := Σ conn[i].delay,    i=1,path.numconns
        / Get the slack for the path relative to max
            delay constraints
        minslack := path slack above minimum constraint
        maxslack := path slack below maximum constraint
        // Determine the amount of connection delay
            that is really
        // available for this path by adding the actual
            connection
        // delay to the slack values. If other paths
            caused a
        // connection along this path to be reduced
            further than
        // this path's original connection targets,
            additional slack
        // will be available to other connections in
            this path, relative
        // to the existing connection targets.
        minslack' := minslack − delays + mintargets
        maxslack' := maxslack + delays − maxtargets
        // Re-distribute the available slack to all
            connections on the
        // path by assigning a portion of the slack
            (proportioned by
        // the connection's target delay relative to
            the summation
        // of target delays) to each connection.
        for each conn in path
            mindelta :=     minslack' * ( conn.mintarget /
                            mintargets )
            maxdelta :=     maxslack' * ( conn.maxtarget /
                            maxtargets )
            // Assign the new delta slack if it is less
                than any previous
            // delta established for this connection in
                this iteration
            if (mindelta < conn.mindelta)
                conn.mindelta = mindelta
            if (maxdelta < conn.maxdelta)
                conn.maxdelta = maxdelta
        end
    end
    // Now add the connection delta values to each
        connection
    // target. Note that the delta values will be
        zero for those
    // connections which lie along paths with zero
        slack, and
    // the delta values will be greater than zero
        for connections
    // that can be relaxed.
    for each conn in design
        conn.mintarget −= conn.mindelta
        conn.maxtarget += conn.maxdelta
    // If all conn.delta values are zero, we're
        done!
end
```

DELAY PREDICTOR

The Delay Predictor takes a driver/load pair for a net, and estimates the best-case wire delay based on a set of heuristics. These heuristics determine which type of routing resource will be used by the router for the connection. In some cases, such as direct connect and certain clock resources, the determination is not subject to guess. In other cases, not only the resource type but how many of each resource are open to question.

Because the Predictor is based on heuristics which may be unique to a specific architecture, the following example will describe the Delay Predictor for the Xilinx XC3000 family of FPGA's. Routing and other resources specific to this architecture will be used to illustrate the heuristic technique, which can be used for any architecture.

The basic connection delay estimate is made without regard to net fanout or topology, both of which have an effect on the connection's delay, and are factored in after the initial estimate is made. (An exception to this is the direct connect.) In the general case, four delay estimates are made, using combinations of local and global routing resources in the horizontal and vertical axes. Special cases considered include clock nets, direct connect routing, special pin locations, input/output synchronization clocks, special pin relationships, and any other case where the four basic estimates are inapplicable.

With reference again to FIG. 2a, the global lines 28, 34 (also know as "longlines") and the general purpose interconnects 26, 32 (also known as local lines) are connected in each channel by "switch matrices 24" (also known as "switch boxes") as previously described. The four standard estimates assume a) switch matrices 24 for both horizontal and vertical traversal; b) switch matrices 24 for vertical, global lines 34 for horizontal; c) global lines 28 for vertical, switch matrices 24 for horizontal; and d) global lines 28,34 for both vertical and horizontal. The minimum delay of these four estimates is used, which is in keeping with the goal of an accurate estimate of the best-case route delay.

With reference to FIG. 4a, a portion of the process flow for basic connection delay estimates in the system and method of the present invention is shown. The process starts at step 100 and proceeds to decision 102 where, if the driver type is the oscillator, a fixed estimate of 1000 is assumed at operation 104. If the driver type is not the oscillator at decision 102, at decision 108, if the driver type is the global clock buffer, a fixed estimate of 2000 is assumed at operation 110. If the driver type is neither the oscillator or the global clock buffer, at decision 112, if the driver and load pins are connected by a single arc, the process proceeds to the subroutine 114 illustrated in more detail in FIG. 4b.

With reference additionally to FIG. 4b, the process flow of subroutine 114 is shown. Subroutine 114 begins at start step 141 and proceeds to decision 140 where, if the driver is of the type clockin, an estimate of clock direct delay is assumed at operation 142 and the subroutine 114 proceeds to return step 149. If the driver is not of the type clockin at decision 140, the subroutine 114 proceeds to decision 144, where, if the driver is an I/O to a clock buffer, an estimate of I/O to clock delay is assumed at operation 146 and the subroutine 114 proceeds to return step 149. If the driver is not of the type I/O to clock buffer, an estimate of direct delay on the number of loads is assumed at operation 148 and the subroutine 114 proceeds to return step 149.

Referring again to FIG. 4a, if following decision 112, the driver and load pins are not connected by a single arc, the process proceeds to decision 116 where, if the driver type is an alternate clock buffer, a fixed estimate of an alternate clock delay is assumed at operation 118 and the process proceeds to end step 106. Otherwise, the process proceeds to subroutine 120 further illustrated in FIG. 4c.

With reference additionally to FIG. 4c, the subroutine 120 is shown in more detail. Subroutine 120 begins at start step 122 and proceeds to operation 124 where the delay is computed for a horizontal longline with a vertical switchbox; a vertical longline with a horizontal switchbox; both horizontal and vertical longlines; and all switch box connection delays. At decision 126, if the driver is a TBUF or an I/O on the top or bottom, than the delay is assumed to be a horizontal longline and vertical switchbox delay at operation 128 and the process proceeds to end step 106. Otherwise, if the driver is not a TBUF or an I/O on the top or bottom, the process continues to decision 130. At decision 130, if the load is an I/O buffer ("IOB") or a left or right load clock pin, the delay is assumed to be a longline plus a horizontal distance at operation 132 and the process proceeds to end step 106. Otherwise, following decision 130, at decision 134, if the distance is 0, the minimum delay is assumed at operation 136 and the process proceeds to end step 106. If the distance at decision 134 is not zero, then the smallest of the four delays computed in operation 124 is assumed at operation 138 and the process is completed at end step 106.

The above-described process flow may also be understood with respect to the following pseudocode representation.

---

Pseudocode: Basic Connection Delay Estimate

--- count the horizontal and vertical switch boxes
if driver comp is the oscillator
    estimate := 1000
else if driver comp is the global clock buffer
    estimate := 2000
else if driver and load pins are connected by a
    single arc
    if driver comp is of type clocking
        estimate := clock_direct_delay
    else if driver comp is an I/O and the load
        comp is a clock buffer
        estimate := io_to_clock_delay
    else
        estimate := direct_delay +
            direct_fanout_penalty * max
            (numloads, 20)
else if driver comp is alternate clock buffer
    and
    load pin is a logic block clock pin
    estimate := alt_clock_delay
else
    forcelongvert := false
    forcelonghoriz := false
    adjust numswitchboxes // see pseudocode
        below
    if load comp is a logic block and load pin
        is a clock pin
        if numswitchboxes is 0
            estimate := minimum_delay
        else
            estimate := numswitchboxes *
                switchbox_delay
        //special case: route the driver
        to the alt clock
        //longline if that longline
        isn't used by the alt clock
        //buffer. note that this
        longline must connect at the
        //top or bottom of the device
        allowvertlongline := this signal
            not the alt clock and
            this load pin doesn't share a

---

Pseudocode: Basic Connection Delay Estimate

--- longline with any
        alt clock load (i.e. reserve
        longline for alt clock)
        if allowvertlongline
            disttotoporbot := number of
                switch boxes
                from driver to top or
                bottom of device
            llestimate :=
                clock_longline_delay +
                (disttotoporbot +
                numhorizswitchboxes) *
                switchbox_delay
            if (llestimate < estimate)
                estimate := llestimate
    else
        // not a logic block clock pin, so
        compute the four basic
        // delays for vertical/horizontal
        longline/switchbox
        vll_hll := 2 * longline_delay
        vll_hsw := longline _ delay +
            (numhorizswitchboxes *
            switchbox_delay)
        vsw_hll := longline_delay +
            (numvertswitchboxes *
            switchbox_delay)
        vsw_hsw := numswitchboxes *
            switchbox_delay
        // see which to use
        if forcelongvert and forcelonghoriz
            estimate := vll_hll
        else if forcelonghoriz
            estimate := vsw_hll
        else if forcelongvert
            estimate := vll_hsw
        else if numswitchboxes is 0
            estimate := minimum_delay
        else if numloadsonsig < 5
            estimate := vsw_hsw
        else
            estimate :=   min (vll_hll,
                vll_hsw, vsw_hll,
                vsw_hsw)
end

---

The number of switch matrices 24 is computed based on the distances in cell rows and column between the driver site and the load site. However, this number must be adjusted if certain conditions exist, such as locations near the perimeter of the FPGA 20 or connections which are in the same column but must loop back to connect.

---

Pseudocode: Adjust Number of Switch Matrices

--- if load comp is the driver comp
    increment numhorizswitchboxes
else if driver comp is a logic cell
    if load comp is a logic cell
        lvc := load pin vertical channel
        lhc := load pin horizontal channel
        dvc := driver vertical channel
        dhc := driver horizontal channel
        if lvc > dvc
            if lhc = dhc
                if lvc − dvc = 1
                    decrement
                    numvertswboxes
                if driverpin is X and
                    load pin is K or EC
                    increment
                    numvertswboxes
                if driver pin is Y and
                    load pin is RD

| Pseudocode: Adjust Number of Switch Matrices |
| --- |
| increment
    numvertswboxes
else
  if driver pin is X and
  load pin is B, C, D,
  E, RD, or K
    decrement
      numvertswboxes
  if driver pin is Y and
  load pin is A, B, C,
  D1 or EC
    decrement
      numvertswboxes
  else if lhc > dvc
    if lvc − dvc = 1
      if driver pin is
      Y and lhc − dhc
      = 1 and
        load pin is D or
        K
          decrement
          numvertswboxes
          by 2
      else
        decrement
        numvertswboxes
        by 1
    else
      decrement
      numvertswboxes
      if driver pin is Y and
      loan pin is B, C, D,
      E, RD, or K
        decrement
        numvertswboxes
  else if lhc < dhc
    if lvc − dvc = 1
      if driver pin is
      X and dhc−lhc==1
      and load pin is
      A, B, D1 or EC
        decrement
        numvertswboxes
        by 2
      else
        decrement
        numvertswboxes
        by 1
    else
      decrement
      numvertswboxes
      if driver pin is
      X and load pin is
      A, B, C, D1,
      or EC
        decrement
        numvertswboxes
  else
  // these pins can only be
    reached from the left, so
  // they require either a
    longline or an extra swbox
    if load pin is B or C
      increment numvertswboxes
    else if lhc < dhc
      if load pin is B, C, D, E,
      RD or K
        increment
        numvertswboxes
    else
      if load pin is A, B, C, D1
      or EC
        increment
        numvertswboxes
else if driver comp is an I/O cell
  if driver comp is on left or right
  edge
    if load pin vertical channel not |

| Pseudocode: Adjust Number of Switch Matrices |
| --- |
|     same as driver
      decrement
      numhorizswitchboxes
    else // must be on top or bottom edge
      if load pin horizontal
      channel not same as driver
        decrement numvertboxes
  else if driver comp is a pullup or
  tri-state buffer
    numhorizswitchboxes := 0
    forcelonghoriz := true
  if load comp is an I/O cell
    if load pin is a clock pin
      if load pin is on left or
      right edge
        forcelongvert := true
      else // must be on top or
      bottom
        forcelonghoriz := true
end |

The Predictor knows about the FPGA 20 architecture and about the router; it does not know to what extent the delay will deviate due to congestion. It compensates for not knowing by adding a penalty, based on the type of device and the density of the design. Also, the delay for a single connection is affected (through additional capacitance) by the other connections on the same net. This penalty is based on the fanout and the extrema of the net. The penalties involve constants which are derived from comparison of the estimates to the delay values obtained by actually routing the connection during development.

| Pseudocode: Adjust Connection Delay for Fanout and Extrema |
| --- |
| Estimate := connection delay estimate
if not direct connect and not alternate clock
  get net extrema
  dist := (xmax −xmin) + (ymax −ymin)
  dist := dist * distractor
  load := loadfactor * min (17, numload)
  estimate := estimate + dist + (dist *
        load)
  estimate := estimate * congestionfactor
end | where "distfactor" and "loadfactor" are coefficients which vary with the FPGA 20 device's speed grade, and "congestionfactor" reflects an application-specific pessimism regarding the router's ability to make the best-case route given factors such as design density.

PLACEMENT ALGORITHM

The placement algorithm used may be, as an example only, a standard optimization algorithm called "simulated annealing." This is a generic method, but it utilizes a qualitative metric (called the "objective function") which evaluates the "goodness" of a given placement.

The implementation of annealing is as follows: All components are placed randomly, in legal positions, with the exception of user-specified component locations, which are simply adhered to. A series of "transformations" is applied to the initial placement, with the goal of improving the placement to a global near-optimum state. In the placer forming part of the NeoCAD Foundry software, these transformations consist of "moving" or "swapping" components or component groups. Transformations are selected, evaluated, and either accepted or rejected based on the objective function and the current "temperature" of the annealing process. The temperature allows transformations which result in a lower quality placement to be accepted. This behavior, which is the primary characteristic of the annealing algorithm, enables the optimization to avoid local minima in the costed search space.

As an example only, the objective function may be composed of two elements which have competing goals. The "completion score" is based on various conditions in the placement at hand which relate to routeability. The "timing score" is based on the degree to which the current placement conforms to the connection targets defined by the timing module. The reason these scores compete is that the completion score is tuned to balance all relevant factors so that the entire design is routeable, and the timing score is concerned only with connections which are constrained by timing preferences such as frequency. Too much emphasis on the latter score results in poor overall routeability, which in turn invalidates to some degree the delay estimates provided by the Delay Predictor, upon which the timing score is based. Therefore, these two scores must be carefully balanced.

The timing score is calculated as follows: If the connection is routed, ignore it, since there is nothing the placer can do about it. Otherwise, obtain the connection score from the timing module for that connection. This score is the number of picoseconds by which the estimated delay exceeds the target maximum (or is exceeded by the target minimum). If the connection score is zero, then the timing score for that connection is zero. Otherwise, the timing score is the sum of a failure penalty (100), and the product of an excess factor (4) and the square of the excess delay in nanoseconds:

| Pseudocode: Compute Placement Connection Timing Score |
| --- |
| excess := 0<br>If maxdelay > maxtarget<br>    excess := maxdelay - maxtarget<br>else if maxdelay < mintarget<br>    excess := mintarget - maxdelay<br>if excess > 0<br>    nanoover := (excess + 999)/1000 // convert to nanoseconds<br>    score :+ (4 * nanoover * nanoover)<br>else<br>    score :+ 0<br>end |

The failure penalty and excess factor represent the mechanism by which the completion score is balanced with the timing score. Since this mechanism exists here, the total completion score is simply added to he total timing score to obtain the overall objective function for a given placement.

ROUTING ALGORITHM

The router may be based, for example, on the standard "costed maze" algorithm. The timing-driven aspects of the router's behavior derive from the costs used, and the ripup-and-reroute strategy employed to achieve a given connection's target without violating another connection's target.

As with the placer, there is a fundamental conflict between the goals of completion and timing constraint satisfaction. Unlike the placer, which applies and weighs these goals in parallel, the router attempts to satisfy them in sequence. First and foremost is completion, for without a completely routed design, the frequency is 0.

The costed maze algorithm routes a single connection at a time, although which connection on a net is not typically predetermined, so it is sometimes a valuable simplifying assumption to route all of the connections on one signal before proceeding to the next.

The costs used during the maze search can be anything. Normally, they are costs associated with particular types of routing resources, plus other penalties for such things as making a turn. When the router searches in delay-driven mode, the cost of getting from the net driver to the current point is simply the delay in picoseconds, provided by the Delay Calculator. The delay-driven costing will be referred to as delay-driven, and all other cost sets will be referred to as cost-driven, or simply as costed.

The router is "iterative," which in this context indicates that the router makes repeated passes through the signals in the design, ripping up and re-routing each signal in an order determined by such factors as routeability, topology, and conformance to connection targets. The router stops when all signals are completely routed and all connection targets are met, or when the router meets some user-specified iteration limit, or when the router decides of its own accord that no further progress can be made in reasonable time.

The concept of "crossover" allows the router to identify what other routes are blocking the current connection by allowing the search to go through blocked passages at some costs. Routing with crossover serves two purposes: it enables the router to shove the blocking signals out of the way; and it provides a record of congested areas to be avoided during subsequent iterations. Both shoving and area avoidance are techniques which contribute heavily to achieving completion and meeting the connection targets.

| Pseudocode: Router Iterations |
| --- |
| repeat<br>    sort signals<br>    for each signal<br>        rip up signal<br>        route signal using costs<br>        if rejected<br>            route signal delay-based<br>            if rejected<br>                route signal with crossover, delay-based<br>                add area-avoidance codes along route path<br>            else<br>                accept route<br>        else<br>            accept route<br>until (all routed and met constraints) or giving up<br>end |

Whether a signal has been re-routed in an acceptable way is based on three factors: a) the number of unrouted connections (fewer is always better, more is always worse; b) the overall timing score for the design; and c) whether the signal has met the timing constraints. If the re-route is rejected, the previous state of the routing is restored.

| Pseudocode: Reject/Accept Signal Route |
| --- |
| rejected := false<br>if there are fewer unrouted connections than before<br>    rejected := false<br>else if there are more unrouted connections than before<br>    rejected := true<br>else<br>    if new score better than old score |

-continued

```
Pseudocode: Reject/Accept Signal Route rejected := false
    else if new score worse than old score
        rejected := true
    else
        if signal constraints are now met
            rejected := false
        else if signal constraints were
            previously met
            rejected := true
end
```

Since the router performs "shoving," which allows one signal to move another out of the way, and since,this process is reasonably transparent to the timing algorithm, the timing scores include the entire design, rather than simply the score of the signal being routed. The timing score in the router is weighted in favor of connections which are members of multiple paths. It is computed as follows:

```
Pseudocode: Compute Router Timing Score score := 0
    for each connection
        if excess > 0
            score := score + excess * numpaths
    end
``` where "numpaths" is the number of paths containing that connection, and "excess" is the number of picoseconds by which the connection delay exceeds the target maximum delay, as described in the placement pseudocode above.

With reference now to FIG. 7, an FPGA design flow 300 in accordance with the system and method of the present invention is shown. Design flow 300 is intended for use with the NeoCAD FPGA Foundry device-independent modular toolset for FPGA design on the industry-standard digital computer platforms previously described. The FPGA architecture description step 302 and NeoCAD technology modelling system step 314 produce the physical device description of step 318. From the physical device description step 318, the design flow 300 proceeds to a technology mapper 320, the EPIC™ editor for programmable IC's 322, place and route 324 and the Prism™ device-independent logic partitioning system.

The design flow begins with the design capture step 304, which comprises a number of possible behavioral or hardware description languages such as Abel or VHDL as well as state machine, Boolean equation or schematic representations. Most FPGA designs are "captured" using schematics. Electronic Design Interchange Format ("EDIF") 308, Xilinx Net list File ("XNF"), QuickLogic Data Interchange Format ("QDIF") 310 result in a net list 316 comprising a logic description of the design. The constraint files 312, which interact with the design capture step 304, include design preferences and, with the net list 316, they provide input to a NeoCAD Generic Database ("NGD") for subsequent input to the technology mapper 320 to generate an annotated net list 332 to the design capture step 304. The technology mapper 320 in conjunction with the editor for programmable IC's 322, place and route 324 and logic-partitioning system 326 develop a NeoCAD Circuit Description ("NCD") 330. By use of the logic-partitioning system 326, a number of NCD's 336 may be developed partitioning the design across multiple FPGA's. The NCD's 330, 336 are supplied as input to the timing module 338 comprising the system and method of the present invention which supplies inputs to the back annotation step of the NGD 328. The NCD's 330, 336 furnish the necessary binary output to programming step 340 to be applied to the target FPGA to program the device to function in accordance with the circuit design.

"As used herein, the term programmable logic device refers to field programmable gate arrays, programmable logic arrays, complex programmable logic devices and programmable logic devices. As used herein, an arc is a programmable connection between two circuit nodes. Further, the terms global and local have been used to refer to specific types of interconnect resources. It is important to note that other types of programmable logic devices and even FPGAs from other manufacturers may use different terminology to refer to their different types of interconnect resources. Such terms as long lines, direct connects, PIPs™ and others may also be used. The important concept is that the present invention is adapted to account for heterogeneous interconnect or routing resources, whatever the type."

While there have been described above, the principles of the present invention in conjunction with specific apparatus and methods, it is to be clearly understood that the foregoing description is made only by way of example and not as a limitation to the scope of the invention.

What is claimed is:

1. A layout process for constructing an electronic circuit from a programmable logic device, said device including a plurality of programmable logic cells having programmable connections therebetween, said process comprising the steps of:

mapping said circuit into logical elements capable of implementation by said programmable logic cells wherein said circuit contains a plurality of paths each comprising a plurality of connections;

receiving timing preferences for said device;

storing said timing preferences in a timing preferences file;

assigning a maximum delay for each of said plurality of paths based upon said timing preferences;

generating a calculated delay for each of a plurality of predetermined connections of said plurality of connections;

generating a predicted delay for each of a plurality of proposed connections of said plurality of connections;

summing said calculated delays for said predetermined connections and said predicted delays for said proposed connections to determine a delay of each of said plurality of paths;

determining an amount by which the delay of each of said plurality of paths exceeds its maximum delay;

routing said plurality of proposed connections to produce transformed paths;

determining an amount by which each of said transformed paths exceeds its maximum delay; and comparing amounts by which said plurality of paths exceed their maximum delays with amounts by which said transformed paths exceed their maximum delays to determine whether to use said transformed paths.

2. The layout process of claim 1 further comprising the steps of:

ordering said programmable connections in accordance with connection constraints of each connection; and routing each connection in order as determined by said ordering step.

3. A system for constructing an electronic circuit from a programmable logic device, said device including a plurality of programmable logic cells having programmable connections therebetween, said system comprising:

means for mapping said circuit into logical elements and combining said logical elements into logical blocks capable of implementation by said programmable logic cells;

means for specifying timing preferences for said device and enumerating a plurality of paths of said circuit, each of said plurality of paths including a plurality of connections;

means for storing said timing preferences in a timing preferences file;

means for generating a calculated delay for each of a plurality of predetermined connections of said plurality of connections;

means for generating a predicted delay for each of a plurality of proposed connections of said plurality of connections;

means for assigning a maximum delay for each of said plurality of connections based upon said timing preferences;

means for determining an amount by which a delay of each of said plurality of connections exceeds its maximum delay;

means for moving one or more of the programmable logic cells to produce one or more transformed paths means for determining an amount by which a delay of each connection of said transformed paths exceeds its maximum delay; and means for comparing the amount by which said connection delay of each of said plurality of paths exceeds said maximum delay with the amount by which a connection delay of each of said transformed paths exceeds said maximum delay to determine whether to use said transformed paths.

4. The system of claim 3 further comprising:

means for ordering said programmable connections in accordance with connection constraints of each connection; and means for routing each connection in order as determined by said means for ordering.

5. A method for laying out an electronic circuit in a programmable logic device including a plurality of programmable logic cells having programmable connections therebetween, said method comprising the steps of:

receiving specifications relating to a specified minimum operating frequency of the circuit;

converting said specifications to timing specifications that include minimum and maximum acceptable connection delays for each path in the circuit;

mapping the circuit into logical elements for implementation by said programmable logic cells;

placing the logical elements of the mapped circuit into specific programmable logic cells within the device;

routing the circuit a first time via said programmable connections to achieve a first routing;

calculating a first overall score for said first routing indicative of an extent to which the circuit is completely routed in said first routing and of an extent to which said first routing meets said specifications;

routing the circuit a second time via said programmable interconnects to achieve a second routing;

calculating a second overall score for said second routing indicative of an extent to which the circuit is completely routed in said second routing and of an extent to which said second routing meets said specifications; and comparing said first and said second overall scores to determine which of said first or said second routings to use.

6. A method as defined in claim 5 wherein said mapping and routing steps are performed in an iterative fashion until connection delays of each path in the circuit are within the range between said minimum and maximum acceptable delays for each connection in the circuit.

7. A method for evaluating a layout of a circuit design on a programmable logic device, comprising the steps of:

receiving a recommended connection delay for each of a plurality of connections of the design;

determining actual delays for connections of the circuit that are routed;

determining estimated delays for connections of the circuit that are not routed; and producing a timing score for the layout, including:

multiplying an excess factor by a square of a time by which a delay of each connection exceeds an associated recommended connection delay to produce a timing score for each of the plurality of connections; and combining timing scores for the plurality of connections.

8. A process for constructing an electronic circuit having predetermined operational frequency constraints from a programmable logic device, said circuit including a plurality of logical elements mapped into mapped logic blocks, said logic device including a plurality of programmable logic cells having programmable connections therebetween, said process comprising the steps of:

identifying paths between programmable logic cells of said logic device for implementing said electronic circuit, each of said paths comprising a plurality of said programmable connections;

converting said operational frequency constraints to maximum connection delays;

assigning said mapped logic blocks of said electronic circuit to specific programmable logic cell locations of said logic device;

routing said programmable connections between said specific programmable logic cells;

computing a first completion score representative of the extent to which the circuit is completely routed within the programmable logic device;

computing a first timing score representative of the extent to which the circuit as routed meets the operational frequency constraints;

routing said programmable connections between said specific programmable logic cells again to achieve a next routing, including unrouting and rerouting programmable connections that exceed associated maximum connection delays;

computing a second completion score representative of the extent to which the circuit is completely routed within the programmable logic device in said next routing;

computing a second timing score representative of the extent to which the circuit as routed in said next routing meets the operational frequency constraints;

comparing the first scores with the second scores, to determine whether to use said next routing.

9. The process of claim 8 further comprising the step of:

downloading interconnect programming to said logic device to turn "on" or "off" the programmable connections so that said logic device functions as said electronic circuit.

10. In a system for implementing a design of a circuit in a programmable logic device, a router comprising:

means for receiving timing specifications for the design;

means for using the timing specifications to determine minimum and maximum connection delays for each of a plurality of connections of each of a plurality of paths comprising the design;

means for assigning resource costs to a plurality of different possible routes for individual paths of the design, including costs for using certain resources of the programmable logic device and costs for making turns;

means for producing an initial routing of the design by routing as many of the plurality of connections as possible and minimizing resource costs;

means for determining whether each routed connection of the plurality of connections meets associated minimum and maximum delays; and means for routing the design again by unrouting and rerouting connections that do not meet associated minimum and maximum delays.

11. The router of claim 10, further comprising:

means for identifying and recording sections of the initial routing that are congested;

means for assigning a cost to routing through one of the congested sections;

means for routing to avoid the congested sections.

12. The router of claim 11, further comprising:

means for routing a connection through one of the congested sections and moving connections occupying the congested section if the connection must go through the congested section to meet its associated minimum and maximum delays.

13. A system for constructing an electronic circuit having predetermined operational frequency constraints from a programmable logic device, said circuit including a plurality of logical elements, said logic device including a plurality of programmable logic cells having programmable connections therebetween, said system comprising:

means for converting said operational frequency constraints to maximum connection delays;

means for identifying a plurality of paths between programmable logic cells, each of said plurality of paths comprising a plurality of programmable connections;

means for mapping said logical elements of said electronic circuit to specific programmable logic cells to form mapped logic cells and assigning locations of mapped logic cells of said logic device;

means for routing each of said plurality of programmable connections;

means for computing a first completion score representative of the extent to which the circuit is completely routed within the programmable logic device;

means for computing a first timing score representative of the extent to which the circuit as routed meets the operational frequency constraints;

means for using said first completion score with said first timing score to obtain a first overall objective function;

means for routing said plurality of programmable connections again to achieve a second routing;

means for computing a second completion score representative of the extent to which the second routing is completely routed within the programmable logic device;

means for computing a second timing score representative of the extent to which the second routing meets the operational frequency constraints;

means for using said second completion score with said second timing score to obtain a second overall objective function for the second routing; and means for comparing the first overall objective function with the second overall objective function to determine whether to use the second routing.

14. The system of claim 13 further comprising:

means for downloading interconnect programming to said logic device to turn "on" or "off" the programmable connections so that said logic device functions as said electronic circuit.

15. A system for laying out an electronic circuit in a programmable logic device including a plurality of programmable logic cells having programmable connections therebetween, said system comprising:

means for receiving specifications relating to a specified minimum operating frequency of the circuit;

means for converting said specifications to timing specifications including minimum and maximum acceptable delays for each of a plurality of connections, each associated with a path in the circuit;

means for mapping the circuit into logical elements for implementation by said programmable logic cells;

means for placing the logical elements of the mapped circuit into specific programmable logic cells within the device; and means for routing the circuit via said programmable connections such that said circuit operates within said specified minimum operating frequency.

16. A system as defined in claim 15 wherein said mapping and routing functions are performed in an iterative fashion until the connection delays for each path in circuit are within the range between said minimum and maximum acceptable delays.

17. A method for placing an electronic circuit having one or more logical functions with specified operational preferences within a programmable logic device having a plurality of programmable logic cells with programmable connections therebetween, said circuit including a plurality of paths, each path including a plurality of connections, said method comprising the steps of:

determining a delay requirement for each of said connections in accordance with said specified operational preferences;

calculating an actual connection delay for each of a plurality of routed connections of said plurality of connections;

producing an estimated connection delay for each of a plurality of unrouted connections of said plurality of connections;

comparing said actual connection delays and said estimated connection delays with said operational preferences to obtain a first overall delay difference;

moving a plurality of said programmable logic cells to produce a new placement and to produce new estimated connection delays;

comparing said actual connection delays and said new estimated connection delays with said operational preferences to obtain a second overall delay difference; and comparing said first overall delay difference with said second overall delay difference to determine whether to use said new placement.

18. The method of claim 17, wherein the step of determining a path delay requirement includes the steps of:

producing a positive slack indication when a connection delay of a path is below a corresponding delay requirement;

producing a negative slack indication when a connection delay of a path is above a corresponding delay requirement;

distributing positive and negative slack among connections of path in proportion to delays corresponding to connections of the path.

19. A computer readable medium storing sequences of instructions which, when executed by a processor, cause the processor to perform the following steps:

receiving a description of a circuit design mapped to logic units and placed within particular sections of the programmable integrated circuit device;

receiving timing requirements for the circuit design;

determining a maximum delay for each of a plurality of connections of the circuit design based upon the timing requirements;

routing the circuit design a first time with the object of routing as many of the plurality of connections as possible;

routing the circuit a second time with the object of making the design as routed meet the timing requirements by making each of the plurality of connections meet an associated maximum delay;

determining if the design as routed the second time includes every connection routed, and if not;

routing the design a third time with the object of routing every connection of the design;

determining if the design as routed the second time meets the timing requirements and if not; and routing the design a fourth time with the object of making the design as routed meet the timing requirements by making each of the plurality of connections meet an associated maximum delay.

20. The medium of claim 19, wherein the step of determining a maximum delay includes the steps of:

calculating a positive slack when a delay of a routed connection is below the maximum delay and producing a negative slack when a delay of a routed connection is above the maximum delay; and distributing the negative slack and the positive slack among the connections in proportion to delays of the connections.

21. The medium of claim 19, wherein the steps of determining include the steps of:

calculating an overall objective score for the second routing based upon an extent to which the circuit design is completely routed and an extent to which the second routing meets the timing requirements;

calculating an overall objective score for the fourth routing based upon an extent to which the circuit design is completely routed and an extent to which the second routing meets the timing requirements; and comparing an overall objective score for the second routing with the overall objective score for the fourth routing to determine whether to use the second or the fourth routing.

22. The medium of claim 21, wherein the steps of calculating an overall objective score include the steps of:

calculating a completion score representative of an extent to which the design is completely routed;

calculating a timing score representative of an extent to which the design meets the timing requirements; and combining the completion score and the timing score to obtain an overall objective score.

23. The medium of claim 22, wherein the step of calculating a timing score include the steps of:

determining timing scores for each of a plurality of connections using the time by which a delay of each connection exceeds an associated maximum delay, a failure penalty for exceeding the associated maximum delay, and an excess factor; and combining timing scores for the plurality of connections.

* * * * *